(12) United States Patent
MacCallum et al.

(10) Patent No.: US 12,527,718 B2
(45) Date of Patent: Jan. 20, 2026

(54) SYSTEMS AND METHODS FOR CONTROLLING POOL/SPA DEVICES

(71) Applicant: Pentair Water Pool & Spa, Inc., Cary, NC (US)

(72) Inventors: David MacCallum, Camarillo, CA (US); Ed Brown, Thousand Oaks, CA (US); Keith Lewis, Newbury Park, CA (US)

(73) Assignee: Pentair Water Pool & Spa, Inc., Cary, NC (US)

( * ) Notice: Subject to any disclaimer, the term of this patent is extended or adjusted under 35 U.S.C. 154(b) by 0 days.

(21) Appl. No.: 18/763,233

(22) Filed: Jul. 3, 2024

(65) Prior Publication Data

US 2024/0350355 A1 Oct. 24, 2024

Related U.S. Application Data

(63) Continuation of application No. 16/387,396, filed on Apr. 17, 2019, now abandoned.
(Continued)

(51) Int. Cl.
*A61H 33/00* (2006.01)
*A61H 1/00* (2006.01)
*H04L 12/28* (2006.01)

(52) U.S. Cl.
CPC .............. *A61H 33/005* (2013.01); *A61H 1/00* (2013.01); *H04L 12/2803* (2013.01);
(Continued)

(58) Field of Classification Search
CPC ................... A61H 33/005; A61H 1/00; A61H 2033/0079; A61H 2033/0083; A61H 2201/501; A61H 2201/5082; A61H 2201/5097; A61H 2201/5043; H04L 12/2803; H04L 12/2809; H04L 12/281; H04L 12/2816; H04L 12/282; H04L 2012/2841; H04L 2012/285; G05B 15/02; G05B 2219/2642

See application file for complete search history.

(56) References Cited

U.S. PATENT DOCUMENTS

| 4,210,533 A | 7/1980 | Astl |
| 4,830,757 A | 5/1989 | Lynch et al. |

(Continued)

FOREIGN PATENT DOCUMENTS

WO 9422261 A1 9/1994

OTHER PUBLICATIONS

"ScreenLogic2 Interface User's Guide", Pentair Water Pool and Spa, Jul. 22, 11, p. 28-34, Total 96 Pages. (Year: 2011).*
(Continued)

*Primary Examiner* — Brian J. Gillis
*Assistant Examiner* — Chhian (Amy) Ling
(74) *Attorney, Agent, or Firm* — Husch Blackwell LLP

(57) ABSTRACT

Systems and methods are provided for the control of pool or spa device circuits. A control system load center may control pool or spa device circuits in response to command data received from local or remote client devices. Activating a feature circuit may involve performing an associated logic function. Multiple feature circuits may be assigned to a feature circuit group which, when activated, may activate all feature circuits assigned to the feature group.

19 Claims, 13 Drawing Sheets

Related U.S. Application Data

(60) Provisional application No. 62/659,000, filed on Apr. 17, 2018.

(52) U.S. Cl.
CPC ........ *H04L 12/2809* (2013.01); *H04L 12/281* (2013.01); *H04L 12/2816* (2013.01); *A61H 2033/0079* (2013.01); *A61H 2201/501* (2013.01); *A61H 2201/5082* (2013.01); *A61H 2201/5097* (2013.01); *H04L 12/282* (2013.01)

(56) References Cited

U.S. PATENT DOCUMENTS

| | | |
|---|---|---|
| 5,002,664 A | 3/1991 | Clack et al. |
| 5,058,032 A | 10/1991 | Farrell et al. |
| 5,492,632 A | 2/1996 | Reber |
| 5,494,573 A | 2/1996 | Schoenmeyr et al. |
| 5,681,482 A | 10/1997 | Reber |
| 5,751,598 A | 5/1998 | Zabinski et al. |
| 5,774,529 A | 6/1998 | Johannsen et al. |
| 5,876,610 A | 3/1999 | Clack et al. |
| 5,895,565 A | 4/1999 | Steininger et al. |
| 6,051,144 A | 4/2000 | Clack et al. |
| 6,096,224 A | 8/2000 | Champie |
| 6,228,255 B1 | 5/2001 | Peterson et al. |
| 6,332,110 B1 | 12/2001 | Wolfe |
| 6,377,171 B1 | 4/2002 | Fewel |
| 6,411,874 B2 | 6/2002 | Morgan et al. |
| 6,436,299 B1 | 8/2002 | Baarman et al. |
| 6,453,257 B1 | 9/2002 | Juhasz |
| 6,456,202 B2 | 9/2002 | Johannsen et al. |
| 6,491,828 B1 | 12/2002 | Sivavec et al. |
| 6,529,590 B1 | 3/2003 | Centers |
| 6,560,543 B2 | 5/2003 | Wolfe et al. |
| 6,575,662 B2 | 6/2003 | French |
| 6,609,070 B1 | 8/2003 | Lueck |
| 6,616,839 B1 | 9/2003 | Peterson et al. |
| 6,625,548 B2 | 9/2003 | Babel |
| 6,670,810 B2 | 12/2003 | Duncan et al. |
| 6,753,186 B2 | 6/2004 | Moskoff |
| 6,822,200 B1 | 11/2004 | Grosch et al. |
| 6,826,267 B2 | 11/2004 | Daum et al. |
| 6,853,291 B1 | 2/2005 | Aisa |
| 6,870,480 B2 | 3/2005 | Suzuki et al. |
| 6,954,701 B2 | 10/2005 | Wolfe |
| 7,014,777 B2 | 3/2006 | Ishikawa et al. |
| 7,104,115 B2 | 9/2006 | Kahn et al. |
| 7,110,920 B2 | 9/2006 | Mccarter et al. |
| 7,204,930 B2 | 4/2007 | Nightingale |
| 7,249,000 B2 | 7/2007 | Kahn et al. |
| 7,292,898 B2 | 11/2007 | Clark et al. |
| 7,319,921 B2 | 1/2008 | Underwood et al. |
| 7,364,651 B2 | 4/2008 | Baarman et al. |
| 7,404,926 B2 | 7/2008 | Rhoades |
| 7,409,301 B2 | 8/2008 | Tynkov |
| 7,414,516 B2 | 8/2008 | Yoon et al. |
| 7,424,399 B2 | 9/2008 | Kahn et al. |
| 7,454,295 B2 | 11/2008 | Wolfe |
| 7,497,957 B2 | 3/2009 | Frank |
| 7,698,073 B2 | 4/2010 | Wolfe |
| 7,767,093 B2 | 8/2010 | Frank |
| 7,820,059 B2 | 10/2010 | Frank |
| 7,873,699 B2 | 1/2011 | Ha et al. |
| 7,919,001 B2 | 4/2011 | Haas et al. |
| 7,949,747 B1 | 5/2011 | Van Oosterwijck et al. |
| 7,988,852 B2 | 8/2011 | Duplessis et al. |
| 7,991,490 B2 | 8/2011 | Kargenian |
| 8,090,480 B2 | 1/2012 | Brumfield et al. |
| 8,118,997 B2 | 2/2012 | Ebrom et al. |
| 8,133,385 B2 | 3/2012 | Premathilake et al. |
| 8,137,537 B2 | 3/2012 | Hirata et al. |
| 8,180,489 B2 | 5/2012 | Quinn et al. |
| 8,211,296 B2 | 7/2012 | Angelilli et al. |
| 8,321,039 B2 | 11/2012 | Graves |
| 8,356,628 B2 | 1/2013 | Quinn et al. |
| 8,377,314 B2 | 2/2013 | Frank |
| 8,392,561 B1 | 3/2013 | Dyer et al. |
| 8,417,377 B2 | 4/2013 | Rothschild |
| 8,504,305 B2 | 8/2013 | Wolfe |
| 8,518,262 B2 | 8/2013 | Watkins et al. |
| 8,529,768 B2 | 9/2013 | Chandler, Jr. |
| 8,532,829 B2 | 9/2013 | Haller et al. |
| 8,535,539 B2 | 9/2013 | Chandler, Jr. |
| 8,535,540 B2 | 9/2013 | Chandler, Jr. |
| 8,540,872 B1 | 9/2013 | Ryan et al. |
| 8,577,623 B2 | 11/2013 | Wolfe |
| 8,588,990 B2 | 11/2013 | Caceres et al. |
| 8,599,008 B2 | 12/2013 | Watson et al. |
| 8,702,977 B2 | 4/2014 | Shah et al. |
| 8,754,780 B2 | 6/2014 | Petite et al. |
| 8,758,628 B2 | 6/2014 | Quinn |
| 8,788,090 B2 | 7/2014 | Rothschild |
| 8,805,594 B2 | 8/2014 | Shah et al. |
| 8,920,619 B2 | 12/2014 | Salzer et al. |
| 8,949,075 B2 | 2/2015 | Higgins et al. |
| 8,958,917 B2 | 2/2015 | Wolfe et al. |
| 8,981,930 B2 | 3/2015 | Horstemeyer et al. |
| 9,015,003 B2 | 4/2015 | Wolfe |
| 9,043,032 B2 | 5/2015 | Paragot et al. |
| 9,056,783 B2 | 6/2015 | Wolfe |
| 9,061,224 B2 | 6/2015 | Verdegan et al. |
| 9,069,927 B2 | 6/2015 | Wolfe |
| 9,159,222 B2 | 10/2015 | Chen et al. |
| 9,212,070 B2 | 12/2015 | Chandler, Jr. |
| 9,223,322 B2 | 12/2015 | Dopslaff et al. |
| 9,225,766 B2 | 12/2015 | Silverstein et al. |
| 9,270,645 B2 | 2/2016 | Dyer et al. |
| 9,409,110 B2 | 8/2016 | Urmenyi et al. |
| 9,418,541 B2 | 8/2016 | Huang et al. |
| 9,453,299 B2 | 9/2016 | Park et al. |
| 9,534,593 B2 | 1/2017 | Cummings et al. |
| 9,714,715 B2 | 7/2017 | Chandler, Jr. et al. |
| 9,800,500 B2 | 10/2017 | West et al. |
| 9,951,451 B2 | 4/2018 | Park et al. |
| 9,970,558 B1 | 5/2018 | Chandler, Jr. et al. |
| 10,011,500 B1 | 7/2018 | Chandler, Jr. et al. |
| 10,012,319 B1 | 7/2018 | Chandler, Jr. et al. |
| 2001/0015099 A1 | 8/2001 | Blaine |
| 2002/0070611 A1 | 6/2002 | Cline et al. |
| 2002/0095269 A1 | 7/2002 | Natalini et al. |
| 2003/0066788 A1 | 4/2003 | Wang et al. |
| 2003/0168389 A1 | 9/2003 | Astle et al. |
| 2003/0174070 A1 | 9/2003 | Garrod et al. |
| 2003/0205509 A1 | 11/2003 | Barnes et al. |
| 2004/0238420 A1 | 12/2004 | Oldendorf et al. |
| 2005/0088119 A1 | 4/2005 | Potucek et al. |
| 2005/0236307 A1 | 10/2005 | Mazurek et al. |
| 2005/0236308 A1 | 10/2005 | Lin |
| 2005/0242013 A1 | 11/2005 | Hunter et al. |
| 2005/0251366 A1 | 11/2005 | Kahn et al. |
| 2005/0258809 A1 | 11/2005 | Karslo |
| 2005/0263444 A1 | 12/2005 | Baca et al. |
| 2006/0020427 A1 | 1/2006 | Kahn et al. |
| 2006/0078435 A1 | 4/2006 | Burza |
| 2007/0090059 A1 | 4/2007 | Plummer et al. |
| 2007/0119789 A1 | 5/2007 | Layton |
| 2007/0219728 A1 | 9/2007 | Papageorgiou et al. |
| 2008/0047329 A1 | 2/2008 | Breed |
| 2008/0105620 A1 | 5/2008 | Hicks |
| 2008/0197788 A1 | 8/2008 | Conover et al. |
| 2008/0210315 A1 | 9/2008 | Harrison |
| 2008/0229927 A1 | 9/2008 | Singh et al. |
| 2009/0078621 A1 | 3/2009 | Nicolai et al. |
| 2009/0166272 A1 | 7/2009 | Selsdon |
| 2009/0250397 A1 | 10/2009 | Geisen et al. |
| 2010/0096302 A1 | 4/2010 | Astle et al. |
| 2010/0204924 A1 | 8/2010 | Wolfe et al. |
| 2010/0241748 A1 | 9/2010 | Ansari et al. |
| 2010/0305759 A1 | 12/2010 | Paragot et al. |
| 2010/0332149 A1 | 12/2010 | Scholpp |
| 2011/0077875 A1 | 3/2011 | Tran et al. |
| 2011/0195664 A1 | 8/2011 | Keirstead et al. |
| 2011/0210049 A1 | 9/2011 | O'Regan, Jr. |

(56) References Cited

U.S. PATENT DOCUMENTS

| | | |
|---|---|---|
| 2011/0284433 A1 | 11/2011 | Shah et al. |
| 2011/0307221 A1 | 12/2011 | Higgins et al. |
| 2012/0074069 A1 | 3/2012 | Ripley et al. |
| 2012/0078722 A1 | 3/2012 | Van Oosterwijck |
| 2012/0125771 A1 | 5/2012 | Salzer et al. |
| 2012/0158336 A1 | 6/2012 | Duchamp et al. |
| 2012/0234776 A1 | 9/2012 | Sand |
| 2012/0259470 A1 | 10/2012 | Nijhawan et al. |
| 2012/0267318 A1 | 10/2012 | Hatten |
| 2012/0312756 A1 | 12/2012 | Chandler, Jr. |
| 2012/0318723 A1 | 12/2012 | Guess |
| 2013/0009781 A1 | 1/2013 | Wolfe |
| 2013/0015137 A1 | 1/2013 | Urmenyi et al. |
| 2013/0062288 A1 | 3/2013 | Spani |
| 2013/0073611 A1 | 3/2013 | Wolfe |
| 2013/0079936 A1 | 3/2013 | Cullen et al. |
| 2013/0108476 A1 | 5/2013 | Guzelgunler |
| 2013/0185079 A1 | 7/2013 | Park et al. |
| 2013/0185786 A1 | 7/2013 | Dyer et al. |
| 2013/0193041 A1 | 8/2013 | Rohde |
| 2013/0214937 A1 | 8/2013 | Petite et al. |
| 2013/0226752 A1 | 8/2013 | Moriya et al. |
| 2014/0013839 A1 | 1/2014 | Chandler, Jr. |
| 2014/0067131 A1 | 3/2014 | Park et al. |
| 2014/0069908 A1 | 3/2014 | Yang et al. |
| 2014/0172322 A1 | 6/2014 | Wolfe |
| 2014/0277777 A1* | 9/2014 | Potucek .................. E04H 4/148 700/282 |
| 2014/0290181 A1 | 10/2014 | Edwards et al. |
| 2014/0303781 A1 | 10/2014 | Xu et al. |
| 2014/0303935 A1 | 10/2014 | Kamel et al. |
| 2014/0304385 A1 | 10/2014 | Lee et al. |
| 2014/0340203 A1 | 11/2014 | Chen et al. |
| 2014/0373926 A1 | 12/2014 | Jha et al. |
| 2014/0379302 A1 | 12/2014 | Park |
| 2015/0014250 A1 | 1/2015 | Volker |
| 2015/0082225 A1 | 3/2015 | Shearer |
| 2015/0134116 A1 | 5/2015 | Li et al. |
| 2015/0134727 A1 | 5/2015 | Lee et al. |
| 2015/0147190 A1 | 5/2015 | Cummings et al. |
| 2015/0219612 A1 | 8/2015 | Wolfe |
| 2015/0243154 A1 | 8/2015 | Uy |
| 2015/0244675 A1 | 8/2015 | Dyer et al. |
| 2015/0277463 A1 | 10/2015 | Hazzard et al. |
| 2015/0292763 A1 | 10/2015 | Jung et al. |
| 2015/0294558 A1 | 10/2015 | Huang et al. |
| 2015/0343348 A1 | 12/2015 | Morris et al. |
| 2015/0358364 A1 | 12/2015 | Lee |
| 2016/0052798 A1 | 2/2016 | Downs et al. |
| 2016/0096741 A1 | 4/2016 | Lee et al. |
| 2016/0121246 A1 | 5/2016 | Yang et al. |
| 2016/0229704 A1 | 8/2016 | Bardwell et al. |
| 2016/0280562 A1 | 9/2016 | Liao et al. |
| 2016/0283878 A1 | 9/2016 | Nathanson et al. |
| 2016/0358443 A1 | 12/2016 | True |
| 2017/0197854 A1 | 7/2017 | Chandler, Jr. et al. |
| 2019/0238358 A1 | 8/2019 | Hurewitz |
| 2020/0319621 A1 | 10/2020 | Roy et al. |
| 2021/0079630 A1 | 3/2021 | Poojary et al. |

OTHER PUBLICATIONS

Pentair, "Pentair Intellitouch ScreenLogic User Manual—Creating a feature circuit macro" Oct. 28, 2014, p. 51, Total 2 Pages. (Year: 2014).

Gebhart, Apple's Home app makes it easy to control your home from your phone. Finally. Sep. 19, 2016, CN ET, 12 Pages, pp. 1-12. (Year: 2016).

* cited by examiner

SYSTEMS AND METHODS FOR CONTROLLING POOL/SPA DEVICES

CROSS REFERENCE TO RELATED APPLICATIONS

This application is a continuation of U.S. patent application Ser. No. 16/387,396 filed Apr. 17, 2019, which claims the priority of U.S. Provisional Patent Application 62/659,000, filed Apr. 17, 2018, the entirety of which are incorporated herein by reference.

BACKGROUND

Residential and commercial pools and spas today are generally associated with a wide variety of electronic devices, such as pumps, chemical controllers, cleaners, lights, and sensors-just to name a few. In order to control such pool and spa devices in a centralized manner, conventional control systems have been developed and implemented. Such conventional control systems tend to rely on direct, physical electrical connection to the devices they control and the devices from which they receive commands from users.

SUMMARY

In light of the deficiencies described above, new systems and methods for providing individuals with the ability to monitor and control the status of water systems and related devices inside and outside of a home or business and to optimize the performance of these systems and devices and overall water use within the home or business are desirable.

A system for controlling a connecting pool or spa system is provided. The system includes one or more internet of things (IoT)-enabled pool or spa devices. The system also includes a control system load center coupled to a remote device via an electronic communication network and a wireless transceiver. The control system load center is designed to selectively control the one or more IoT-enabled pool or spa devices. The control system load center includes a memory device designed to store a definition of a feature circuit and a logic function associated with the feature circuit. The definition of the feature circuit is assigned using the remote device and includes a group of pool or spa device circuits associated with multiple IoT-enabled pool or spa devices. The logic function causes the group of pool or spa device circuits to activate when the feature circuit is activated. The system also includes a processor communicatively coupled to the memory device. The processor executes computer-readable instructions which, when executed, cause the processor to receive command data from the remote device via the electronic communication network. In response to the command data, the processor activates the feature circuit to selectively control the group of pool or spa device circuits according to the logic function.

In some forms, the logic function causes the group of pool or spa device circuits assigned to the feature circuit to be turned off when the feature circuit is activated. In some aspects, the logic function causes the group of pool or spa device circuits assigned to the feature circuit to be turned on when the feature circuit is activated. In some embodiments, the logic function causes a first subset of circuits of the group of pool or spa device circuits assigned to the feature circuit to be turned off when a second subset of circuits of the group of pool or spa device circuits assigned to the feature circuit are turned on, when the feature circuit is activated. In some forms, the logic function defines time-based rules for activating at least a first pool or spa device circuit of the group of pool or spa device circuits assigned to the feature circuit. In some aspects, the time-based rules are defined in relation to deactivating at least a second pool or spa device circuit assigned to the feature circuit. In some embodiments, the logic function associated with the feature circuit defines how the group of pool or spa device circuits assigned to the feature circuit are controlled individually, in connection to other pool or spa device circuits assigned to the feature circuit, or a combination thereof. In some forms, multiple feature circuits can be assigned to a feature circuit group, such that when the feature circuit group is activated, all of the feature circuits assigned to the feature circuit group are activated. In some aspects, the one or more IoT-enabled pool or spa devices are provided in the form of a chemical controller, a smart valve, a pump, a heater, a light, a sensor, and automatic pool cover, a jet, a pool cleaner, or a combination thereof. In some embodiments, the group of pool or spa device circuits are assigned to the feature circuit via the remote device without using auxiliary circuits or relay outputs.

In another aspect, method for controlling a connected pool or spa system is provided. The method includes providing one or more IoT-enabled pool or spa devices. The one or more IoT-enabled pool or spa devices are selectively controlled using a control system load center coupled to a remote device via an electronic communication network and a wireless transceiver. A definition of a feature circuit and a logic function associated with the feature circuit is received via the remote device. The definition of the feature circuit is stored in a memory device of the control system load center. The definition includes a group of pool or spa device circuits associated with multiple IoT-enabled pool or spa devices. Command data is received from the remote device via the electronic communication network. The feature circuit is activated using a processor coupled to the memory device. The group of pool or spa device circuits are selectively controlled according to the logic function when the associated feature circuit is activated.

In some aspects, a first pool or spa circuit of the group of pool or spa device circuits assigned to the feature circuit is activated based on time-based rules associated with the logic function. In some forms, the time-based rules are defined in relation to deactivating at least a second pool or spa device circuit assigned to the feature circuit. In some embodiments, the group of pool or spa device circuits are assigned to the feature circuit via the remote device without using auxiliary circuits or relay outputs. In some aspects, the IoT-enabled pool or spa devices assigned to the feature circuit are identified using the processor of the control system load center. In some forms, identifying the IoT-enabled pool or spa devices assigned to the feature circuit is based on the definition of the feature circuit. In some embodiments, the method also includes activating a nocturnal cooling feature associated with the feature circuit at a predefined time according to a user-created schedule. The method may also include circulating warm pool water through a solar collector panel at the predefined time.

In another aspect, a system for controlling a connected pool or spa system is provided. The system includes one or more IoT-enabled pool or spa devices. The system also includes a control system load center coupled to a remote device designed to selectively control the one or more IoT-enabled pool or spa devices. The control system load system includes a memory device designed to store a definition of a feature circuit and a logic function associated with the feature circuit. The definition of the feature circuit is assigned using the remote device and includes a group of pool or spa device circuits associated with multiple IoT-enabled pool or spa devices. The logic function causes the group of pool or spa device circuits to activate when the feature circuit is activated. The control load system also includes a processor communicatively coupled to the memory device. The processor executes computer-readable instructions which, when executed, cause the processor to receive command data from the remote device via an electronic communication network. The processor also activates the feature circuit to selectively control the group of pool or spa device circuits according to the logic function in response to receiving the command data. The processor also generates a display for the remote device indicating the group of pool or spa device circuits that are presently active when the feature circuit is activated.

In some aspects, the one or more IoT-enabled pool or spa devices is provided in the form of a chemical controller, a smart valve, a pump, a heater, a light, a sensor, and automatic pool cover, a jet, a pool cleaner, or a combination thereof. In some forms, the group of pool or spa device circuits are assigned to the feature circuit via the remote device without using auxiliary circuits or relay outputs.

DESCRIPTION OF THE DRAWINGS

The invention will be better understood and features, aspects and advantages other than those set forth above will become apparent when consideration is given to the following detailed description. Such detailed description makes reference to the following drawings.

DETAILED DESCRIPTION

Figure 1A:
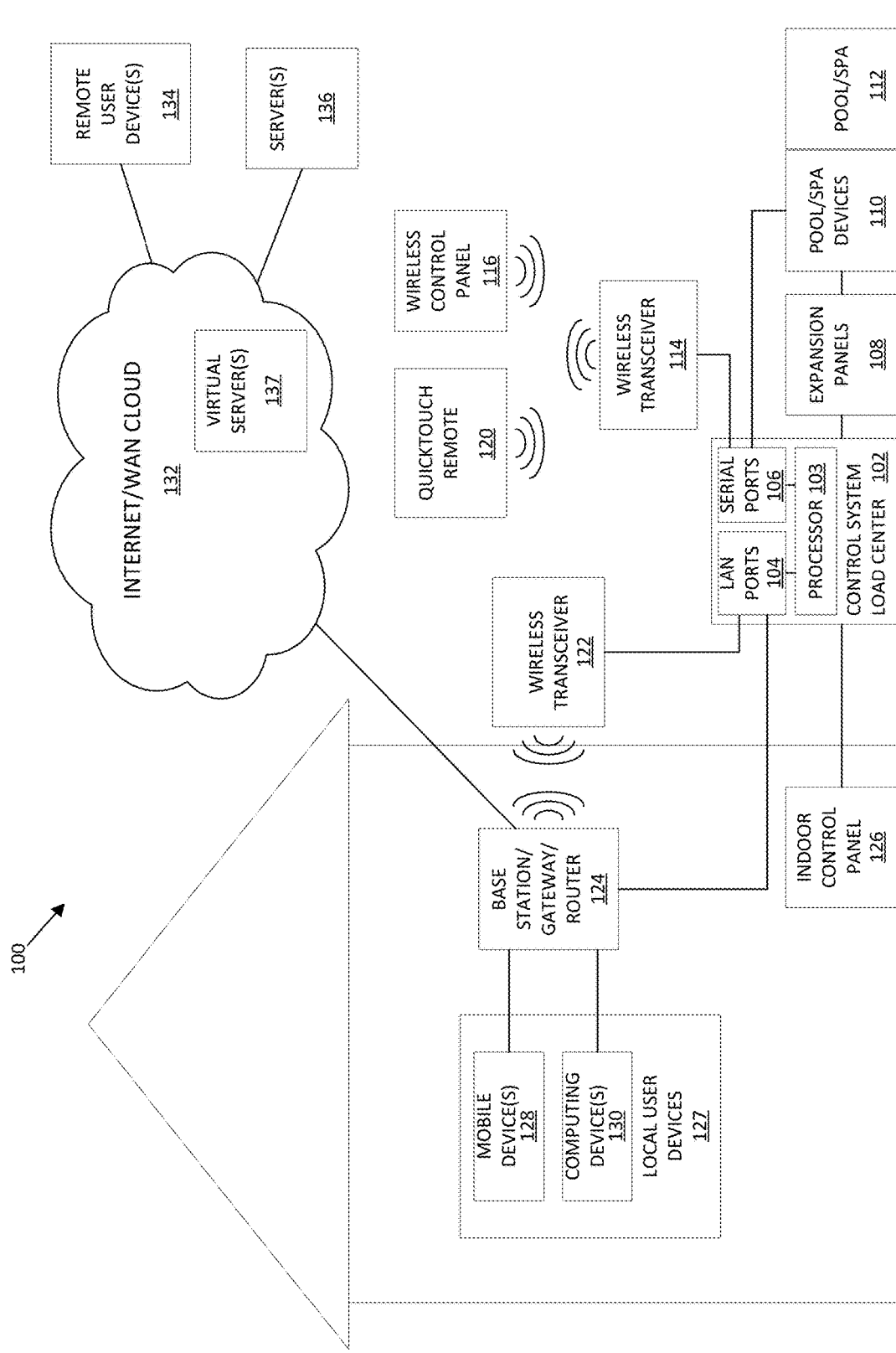
FIG. 1A is a diagram of a computing environment for deploying a network enabled control system in accordance with an embodiment.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

Configuring or otherwise modifying the operation of conventional pool/spa control systems generally requires a user to be physically present at a control panel. Additionally, conventional pool/spa control systems may not be scalable (i.e., the ability to connect new devices to the control system may be limited by the number of connections/relays available at a main control panel of the control system).

Thus, there is a need for scalable, remotely accessible control systems for pool and spa applications.

Figure 1B:
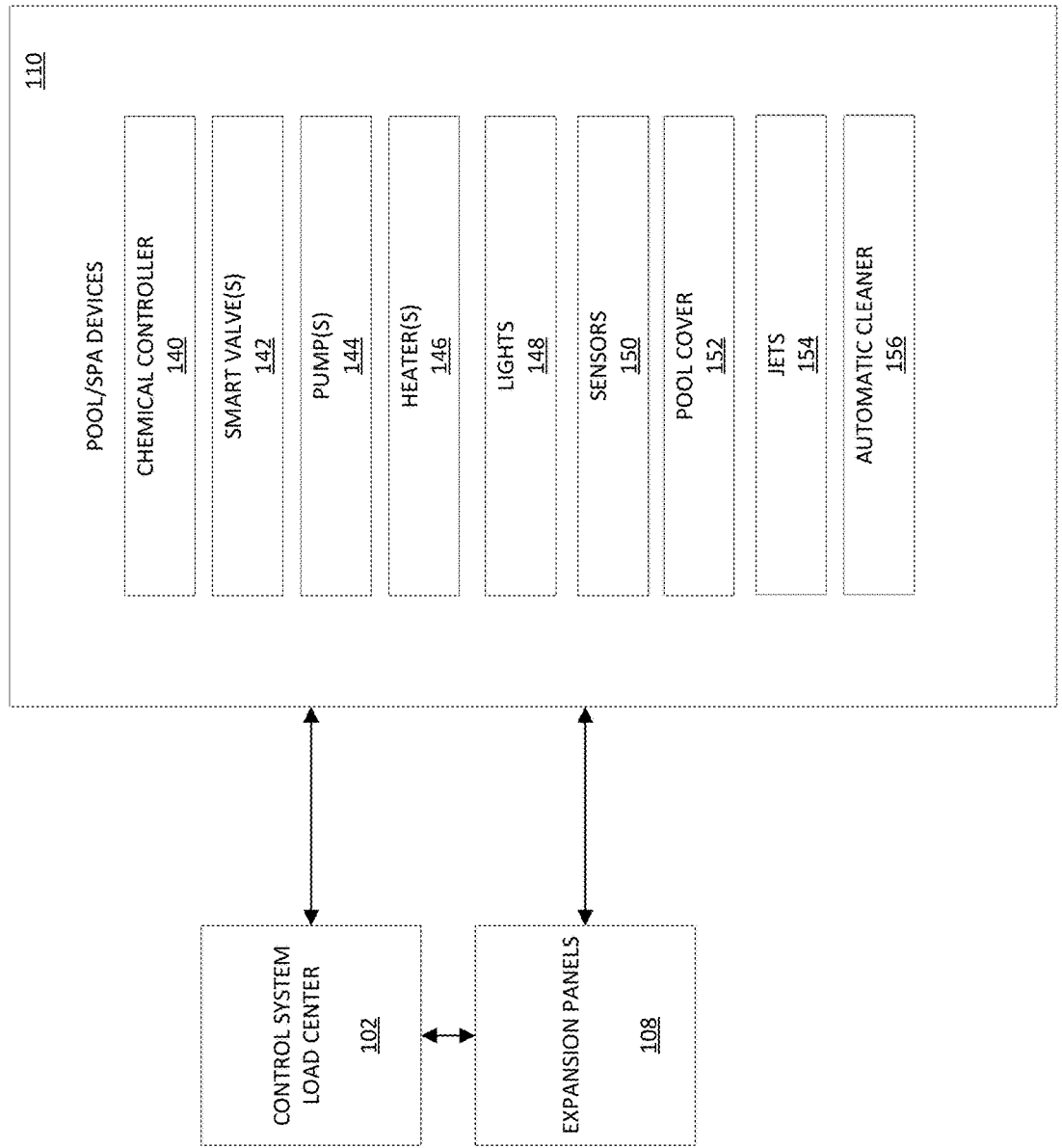
FIG. 1B is a block diagram of an example embodiment of various Internet of Things (IoT) pool and spa devices that may be connected to the load center and expansion panels of the network enabled control system, in accordance with an embodiment.

FIGS. 1A and 1B illustrate an example computing environment 100 for wired and/or wireless monitoring and control of electronic and mechanical devices 110 (e.g., pool/spa devices 110) that are deployed in a physical environment, such as a pool/spa environment that includes at least one pool and/or spa 112, via a control system load center 102 and, optionally, expansion panels 108 that may be electrically coupled to the control system load center 102. The control system load center 102 may include one or more LAN communication ports 104, one or more serial communication ports 106, and a processor 103 (sometimes referred to herein as a control system processor) that is coupled to the LAN ports 104 and the serial ports 106. The control system load center 102 may additionally include one or more computer memory devices (not shown). In some embodiments, one or more expansion panels 108 may be connected to the control system load center 102 (e.g., via one or more serial ports 106 of the control system load center 102), which may allow the number of control connections and/or relays used to control the pool/spa devices 110 to be expanded beyond the number that would be available in the control system load center 102 alone. As will be described, the pool/spa devices 110 may be coupled to, integrated with, in fluid communication with, and/or disposed proximal to the pool and/or spa 112. As shown in FIG. 1B, the pool/spa devices 110 may include one or more of a chemical controller 140, smart valves 142, pumps 144, heaters 146, lights 148, sensors 150, an automatic pool cover 152, jets 154, and/or an automatic cleaner 156.

The chemical controller 140 may be part of a water chemistry system in fluid communication with the pool and/or spa 112. The chemical controller 140 may cause the water chemistry system to sanitize (e.g., via the application of chlorine and/or other applicable chemicals to the water of the pool and/or spa 112) and/or PH balance (e.g., via the application of acidic or basic chemicals to the pool and/or spa 112, which may be performed in based on a pH level of the water of the pool and/or spa 112 detected via one or more pH sensors of the water chemistry system) the water of the pool and/or spa 112. The chemical controller 140 may be configured to supply a predetermined amount (e.g., user-defined or service-professional-defined via interaction with the control system load center 102) of chlorine or other sanitization chemical to the water of the pool and/or spa 112 at programmed (e.g., user-defined or service-professional-defined via interaction with the control system load center 102), regularly scheduled intervals. In some embodiments, the chemical controller 140 may be configured to perform a "super chlorination" function, in which currently set chlorine output levels are overridden, and a higher, "super chlorination" output level (e.g., 100% output) is set for a selectable period of time (e.g., 24 hours).

One or more smart valves 142 may be included in the pool/spa devices 110 and coupled to and controlled by the control system load center 102 and/or the expansion panels 108. For example, a given smart valve 142 may include a motorized valve actuator and a valve controlled by the valve actuator having at least an inlet and an outlet through which water may be selectively allowed or disallowed to flow, based on commands received by the valve actuator from the control system load center 102 and/or expansion panels 108. In some embodiments, a valve actuator of a given smart valve 142 may control the flow of water through the corresponding valve according to a defined water flow percentage. For example, a user may set (e.g., via interaction with a user interface displayed on an electronic screen of one of control panels 116, 126 or user devices 127, 128, 130, 134, as will be described) a water flow percentage of 75% for a given smart valve 142 and, in response, the valve actuator of the smart valve 142 may cause the corresponding valve to be opened to 75% of its maximum. In some embodiments, smart valves 142 may be included as one or more of an intake valve (e.g., coupled between the outlet of a pool/spa pump, which may be included in pumps 144, and the pool and/or spa 112), a return valve (e.g., coupled between the inlet of the pool/spa pump and the pool and/or spa 112), a water-feature valve, a solar heater valve, a valve for an in-floor cleaner (e.g., automatic cleaner 156), and/or other applicable valves that may be included in the pool and/or spa environment. In some embodiments, one or more of the smart valves 142 may be included in one or more programmable feature circuits (e.g., defined in memory of the control system load center 102), as will be described.

One or more pumps 144 may be included in the pool/spa devices 110. For example, the pumps 144 may include one or more of: a pool filter pump, a spa filter pump, a combined pool/spa filter pump and/or an automatic cleaner pump. In some embodiments, the filter pump may be a variable speed pump, having two or more selectable pump speeds. The control system load center may control the speed at which the filter pump operates. For example, a user and/or service technician may define the speed at which the filter pump operates via interaction with a user interface displayed on an electronic screen of one of control panels 116, 126 or user devices 127, 128, 130, 134. In some embodiments, a schedule may be created via the user interface, which may define one or more pump speeds at which the filter pump is to be commanded to operate at different times of day and/or on different days of the week, and may define one or more time periods at which the filter pump is to be turned off. In some embodiments, a user or service technician may define programmable "feature circuits," (i.e., programmed switching circuits), as will be described. These feature circuits may be defined in a memory device of the control system load center 102, for example.

The heaters 146 may include one or more of a solar heater, a gas heater, an electric heater (e.g., an electric heat pump), and/or a hybrid heater (e.g., which may combine a solar heater with a gas and/or electric heater). The heaters 146 may be activated in response to selection by a user via a user interface (e.g., displayed on an electronic screen of one of control panels 116, 126 or user devices 127, 128, 130, 134) or may automatically activate at a predefined time according to a user-created schedule. For systems with multiple heaters 146, a user may select the type or types of heater to activate during a particular time period via the user interface.

For embodiments in which the heaters 146 include a solar heater, a nocturnal cooling feature may be selectively enabled, which provides automatic cooling of pool water during nighttime hours, which may be beneficial for pools that overheat in hot climates. The nocturnal cooling feature may be activated in response to selection by a user via a user interface (e.g., displayed on an electronic screen of one of control panels 116, 126 or user devices 127, 128, 130, 134) or may automatically activate at a predefined time according to a user-created schedule. The nocturnal cooling feature may operate by circulating warm pool water through the solar collector panels at night (e.g., when the collector panels may be cooler than the pool water), which may lower the temperature of the pool water over time.

The lights 148 may include one or more lights that may be any applicable combination of: color changing, submersible, multi-light assemblies, single-light assemblies, light emitting diodes (LEDs), and/or incandescent. As will be described, the lights 148 may be organized into light groups, such that particular functions (e.g., color changing, strobing, pulsing, "swimming", etc.) of the lights in a given light group may be activated in a synchronized way and/or according to a predefined configuration. In some embodiments, a "light group" may be defined group to which one or more light circuits of the lights 148 have been assigned. For example, light groups may be defined in a memory device of the control system load center 102.

The sensors 150 may include flow sensors, temperature sensors, chemical sensors (e.g., chlorine/pH sensors), splash sensors, and/or any other applicable sensor that may be coupled to the pool and/or spa 112 and/or coupled to or integrated with one or more of the pool/spa devices 110. Each of the sensors 150 may produce respective sensor data, which may differ in format and the property being sensed, depending on the type of sensor being used. For example, flow sensors generate and output flow data corresponding to a detected flow rate of water passing through or proximal to the flow sensors; temperature sensors generate and output temperature data corresponding to detected temperature; chlorine sensors generate and output chlorine level data corresponding to detected chlorine levels in water; pH sensors generate and output pH level data corresponding to detected pH levels in water; splash sensors generate and output motion data, which may be a binary representation that goes high when motion is detected over a predefined threshold and low otherwise, or which may be a more complex representation that logs the magnitudes of detected motion over time. Sensor data generated by the sensors 150 may be transmitted to one or more of the servers 136, 137 (e.g., via the control system load center) and stored in one or more databases stored on one or more memory devices thereof. In some embodiments, the sensor data may be collected and stored locally before being sent to the servers 136, 137. The sensor data may be accessed from the servers 136, 137 by any of user devices 127, 128, 130, 134, for example. The sensor data may be displayed on a user interface on an electronic screen of such user devices in the form of raw data and/or graphs. Sensor data may be displayed in this way for a selected (e.g., selected by the user via interaction with the user interface) time period, such as over the course of hours, days, weeks, months, or years, for example.

The pool cover 152 may be may include a pool cover sensor switch (e.g., in the form of an electric/mechanical switch, which may be a "dry contact") that may be open or close a circuit (e.g., a circuit coupled to the control system load center 102 or the expansion panels 108) based on whether the pool cover 152 is in an open position or a closed position. In this way, the control system load center 102 may identify whether the pool cover is open or closed (e.g., with open referring to a state in which the pool cover does not cover the pool, and closed referring to a state in which the pool cover does cover the pool). In some embodiments, the operation of various pool/spa circuits and/or feature circuits may be controlled based on whether the pool cover is open or closed (e.g., determined based on whether the pool cover sensor switch is opened or closed). A pool cover interface screen of the user interface may allow a user to define which pool/spa circuits of the pool/spa device 110, which feature circuits/groups, and which light circuits/groups are activated or deactivated when the pool cover switch is opened and, separately, when the pool cover switch is closed. For example, in an embodiment where the pool cover switch being closed corresponds to the pool cover being closed, when the pool cover switch is closed, the chlorine output of the chemical controller may be decreased (e.g., to 20% of max), laminar flow features may be disabled, and/or a speed of the filter pump may be reduced.

The jets 154 may be disposed at the floor, walls, or other structures of the pool and/or spa 112, and designed to output pressurized water. The jets 154 may be turned on or off based on commands received from the control system load center 102 or the expansion panels 108. In some embodiments, the jets 154 may be controlled by sending commands one or more actuators of the smart valves 142 and/or one or more of the pumps 144, rather than controlling the jets themselves. In some embodiments, the pressure output by the jets 154 may be selectively controllable (e.g., based on user input to a user interface displayed on an electronic screen of one of control panels 116, 126 or user devices 127, 128, 130, 134). In some embodiments, the jets 154 may be configured to operate according to a user-defined schedule.

The automatic cleaner 156 may, for example, be a floor-based automatic cleaner, robotic automatic cleaner, pressure-side automatic cleaner, and/or suction-side automatic cleaner. The automatic cleaner 156 may be turned on or off based on commands received from the control system load center 102 or the expansion panels 108. In some embodiments, the automatic cleaner 156 may be configured to operate according to a user-defined schedule. The automatic cleaner 156 may include an automatic cleaner pump, the operation of which may be limited based on whether other pool/spa devices (e.g., a solar heater of the heaters 146, a spa pump, etc.) are active, as will be described later in connection with FIG. 9.

Returning to FIG. 1A, the control system load panel 102 and the expansion panels 108 may be connected to one or more of the pool/spa devices 110 through various wired connections. For example, the control system load panel 102 may include multiple high voltage relays (e.g., 120 V and/or 240 V) in addition to the serial communication ports 106 and LAN ports 104, through which the pumps 144, and lights 148 of the pool/spa devices 110 may be selectively powered. In some embodiments, the control system load panel 102 and/or the expansion panels 108 may include one or more low voltage control ports and relays (e.g., capable of outputting and/or controlling low voltage control signals, which may be 12V, 24V, or another applicable voltage). In some embodiments, expansion boards may be installed in the system load panel 102 and/or the expansion panels 108, which may provide additional high or low power relays and/or control ports (e.g., for controlling the smart valves 142).

Some or all of the control system load center 102, the expansion panels 108, and/or the pool/spa devices 110 may be natively or retroactively enabled to connect to the internet or another wide-area network (WAN) cloud 132 via a base station/gateway/router 124 to send and receive electronic data. In some embodiments, some or all of the pool/spa devices may be Internet of Things (IoT) devices. Each of the IoT devices may be embedded with electronics, software, sensors, actuators, and network connectivity, either within the device itself or in cooperation with one or more connected servers 136, which enable the IoT devices and their embedded software to collect and exchange data. In some embodiments, the IoT devices of the pool/spa devices 110 may communicate with the servers 136 and/or remote user devices 134 via electronic communication between the control system load center 102 and the pool/spa devices 110 (e.g., via serial ports 106 of the control system load center 102, and/or a wireless transceiver, such as wireless transceiver 114), via communication between the control system load center 102 and the base station/gateway/router 124 (e.g., via LAN ports 104 of the control system load center 102 and/or via the wireless transceiver 122), and via communication between the base station/gateway/router 124 and the remote user devices 134 and/or servers 136 via the WAN 132. It should be understood that, while the pool/spa devices 110 may include serial communications capabilities and may be connected to the control system load center 102 via serial ports 106, some or all of the pool/spa devices 110 may include wireless communication capabilities. In such embodiments, wireless enabled devices of the pool/spa devices 110 may connect to and communicate with the control system load center 102 via the wireless transceiver 114 or through the wireless transceiver 122 via a wireless connection to the base station/gateway/router 124.

In some embodiments, the control system load center 102 may include a wireless access point to which these wireless enabled devices may connect. In some embodiments, communication between the control system load center 102 and these wireless enabled devices may be performed, such that data is wirelessly transmitted from a wireless enabled device to the base station/gateway/router 124 or another base station/gateway/router that is part of a separate LAN, then the data is passed through the internet/WAN network 132 to servers 136/137, the servers then passing the data back through the internet/WAN network 132, through the base station/gateway/router 124, through the wireless transceiver 122 and/or the LAN ports 104 to the control system load center 102. Communication of data from the control system load center 102 to the wireless enabled device would reverse this data path. This latter example may allow a single control system load center 102 to communicate with and control multiple sets of wireless enabled pool/spa devices that may be communicatively coupled to multiple LANs, thereby allowing for the control and monitoring of multiple pools and/or spas at different locations with a single control system load center 102.

In some embodiments, one or more of the expansion panels 108 may also be wireless enabled (e.g., containing or being coupled to a wireless network interface circuit/module), and may utilize wireless communication to send and receive data to/from the control system load center 102 using data paths similar to those examples described above in connection with the wireless enabled pool/spa devices.

Additionally, local user devices 127, which may include smartphones and client computers, such as a mobile computing device 128 and a client computing device 130, respectively, may communicate with the pool/spa devices 110 via the base station/gateway/router 124, the control system load center 102, and/or the expansion panels 108. As shown, in some embodiments the wireless transceivers 122 and 114 may be auxiliary devices (e.g., such as wireless dongles) that are connected to the control system load center 102 via connections to LAN ports 104 and serial ports 106 of the control system load center 102, respectively. However, in other embodiments, one or both of the wireless transceivers 122 and 114 may be internal components of the control system load center 102 (e.g., as part of one or more printed circuit boards, network interface cards, and/or other applicable substrates). In some embodiments, the wireless transceiver 122 may communicate with the base station/gateway/router 124 via a wireless communication protocol, which may be, for example, a communication protocol corresponding to one or more of the IEEE 802.11 standards, such as Wi-Fi™ (e.g., operating in the 2.4 and/or 5 GHz bands). As shown, in some embodiments, one or more of the LAN ports 104 of the control system load center may alternatively or additionally be electrically coupled to the base station/gateway/router 124 via a physical, wired connection (e.g., via an Ethernet cable, such as CAT5/CAT5e/CAT6).

In some embodiments, various IoT devices of the pool/spa devices 110 in an environment 100 may send and/or receive data transmissions over the WAN 132, a local area network (LAN) (e.g., consisting of local devices connected to the base station/gateway router 124), and/or another communication network using any suitable communication protocol. For example, the IoT devices may communicate over the LAN (e.g., via the base station/gateway router 124) with the local client computing device 130, such as in a private network where transmitted data to/from the IoT devices is isolated from the internet or another WAN 132, at least until the data is processed by the local client computing device 130. Local user devices 127 may also be connected to the base station/gateway router 124 in order to access the data generated by the IoT devices as described below. In some embodiments, IP connectivity may be used, connecting the LAN corresponding to the base station/gateway/router 124 to the Internet or another WAN 132, so that remote user devices 134 (e.g., remote smart phones, computers, and other applicable network-enabled client devices) and servers 136 may communicate with the control system load center 102 and/or the pool/spa devices 110.

In some embodiments, IoT devices of the pool and spa devices 110 and/or the control system load center 102 may communicate with and directly use the resources of one or more physical, remote server computing devices of the servers 136, which may be deployed in one or more data centers (for example) in a particular geographic location or dispersed throughout several geographic locations. In other embodiments, the servers 136 may cooperate to provide virtualized computing resources that can be allocated for use by, for example, an authorized user of a computing resource service provider. Thus, a user that controls, or provides services for, the IoT devices of the pool/spa devices 110 and/or the control system load center 102 may configure and deploy one or more virtual servers 137 that are allocated the use of certain physical computing resources, such as processor cycles, memory, data storage, etc., of the physical servers 136; the IoT devices of the pool/spa devices 110 and/or the control system load center 102 may, in turn, be configured to connect to the virtual servers 137. For example, an IoT device may be programmed to connect to an IP address associated with an endpoint that connects a virtual network adapter of the servers 137 to a physical network adapter of the physical servers 136. The virtual servers 137, or the computing resource service provider's computing environment in which the virtual servers 137 are deployed, may provide other computing resource services for implementing an IoT platform.

A user may operate one or more local user devices 127, which may include client computing devices 130, such as a desktop or laptop computer, or a mobile computing device 128 such as a phone or tablet, running client software that enables the devices 127, 128, 130 to access an interface to the IoT platform provided by a server 136, 137. Each of these client computing devices 127, 128, 130 may include at least one processor executing specific computer-executable instructions (i.e., the running software) stored in a memory coupled to the client computing device. The user may access and run a client-based software such as a web browser or web application, in order to request access to the system level software and/or the GUI (e.g., by entering a Uniform Resource Locator (URL) for a web page including the GUI). This request may identify the IP address for the server(s), as well as instructions to generate and render the GUI and/or web page for the system level software. The server(s) may execute one or more software instructions to generate and render the GUI, and transmit it to the client computing device 127, 128, 130 for display. The server(s) 136, 137 may include components and data processing capabilities used to host and run software applications that allow for bi-directional communication between each IoT device of the pool/spa devices 110 and/or the control system load center 120 and the server(s). For example, the server(s) may host the customizable software that is deployed to, and installed on, each IoT device and/or the control system load center 102. The server(s) may also run the software and protocols for other services used by the IoT platform, as well as for the interface to the client computing devices 127, 128, 130. Example uses of the user interface to the IoT platform include configuring and deploying server resources, configuring and deploying software and settings for IoT devices, obtaining and/or reviewing data collected by the server(s) from the IoT devices of the pool/spa devices (e.g., viewing current status and/or historical data collected over time), performing and/or reviewing data analysis, accessing particular IoT devices, etc. Additionally, the computing devices 127, 128, 130 and/or the control panels 116, 126 may act as "control devices" for the control system load center 102, and may send commands to the control system load center 102 in the form of one or a series of control signals (sometimes referred to as "command data"). For example, in response to commands received from the control devices, the control system load center 102 may selectively activate, deactivate, or otherwise control one or more pool/spa devices 110, one or more feature circuits, feature circuit groups, and/or light groups and corresponding logic functions may be defined (e.g., programmed) for circuits of the pool/spa devices 110, and/or settings of the control system load center 102 may be customized. For example, a given feature circuit may be defined in memory (e.g., in response to corresponding command data received from a client device) along with a logic function that causes all circuits assigned to the feature circuit to be turned off, a logic function that causes all circuits assigned to the feature circuit to be turned on, a logic function that causes a first subset of the circuits assigned to the feature circuit to be turned off any time a second subset of the circuits assigned to the feature circuit are turned on, a logic function that defines time-based rules for the activation and/or deactivation of at least a first circuit assigned to the feature circuit in relation to the activation and/or deactivation of at least a second circuit assigned to the feature circuit (e.g., the first circuit must be turned on for at least five minutes before the second circuit is turned on; the first circuit must be turned off for at least ten minutes if the second circuit is turned on while the first circuit is on, etc.), or other applicable logic functions. Generally, the logic function associated with a feature circuit defines how pool/spa device circuits assigned to the feature circuit are to be controlled (individually or with respect to other pool/spa device circuits assigned to the feature circuit) when the feature circuit is activated.

As another example, a client device (e.g., the wireless control panel 116, the indoor control panel 126, and/or or local or remote user devices 127, 128, 130, 134) may send a first command to the control system load center 102 (e.g., or a processor thereof), the first command defining a feature circuit according to circuits (e.g., pool/spa device circuits) assigned to the feature circuit (e.g., in response to user input provided at a user interface of the client device), and the first command further defining a corresponding logic function that is to be performed in connection with the circuits assigned to the feature circuit when the feature circuit is activated. The control system load center 102 may cause definitions of the feature circuit and the logic function to be stored in a memory device of the control system load center 102. The client device may later send a second command to the control system load center 102, the second command requesting the activation of the feature circuit that was defined based on the first command. A processor of the control system load center 102 may retrieve the definitions of the feature circuit and the logic function from the memory device in response to the second command. The processor of the control system load center 102 may identify the pool/spa device circuits assigned to the feature circuit based on the definition of the feature circuit. The processor of the control system load center 102 may then selectively control the circuits assigned to the feature circuit according to the logic function.

Various dedicated devices, such as a "QuickTouch" remote 120, a wireless control panel 116, and/or an indoor control panel 126, may be configured to interact with (e.g., control and/or retrieve data from or related to—via wired or wireless electronic communication) the control system load center 102 and/or the pool/spa devices 110.

For example, the indoor control panel 126 may be electrically coupled to and in electronic communication with the control system load center 102 (e.g., via a serial connection, such as a RS485 connection). The indoor control panel 126 may include an electronic screen that may display a user interface through which a user may interact with the control system load center 102 and the pool/spa devices 110. For example, the electronic screen of the indoor control panel 126 may be a capacitive touch screen.

For example, the wireless control panel 116 may be wirelessly connected to the control system load center 102 via a wireless transceiver 114 that may be connected to (e.g., via a serial connection, such as RS485, between the wireless transceiver 114 and the serial ports 106) or integrated with the control system load center 102. In some embodiments, wireless communication between the wireless control panel 116 and the wireless transceiver 114 may be performed according to a predefined wireless communication protocol, which may be, for example, a personal area network (PAN) communication protocol such as Bluetooth®. The wireless control panel 116 may be a portable device (e.g., battery powered). The battery of the wireless control panel 116 may be recharged by placing the wireless control panel 116 in a docking station (e.g., sometimes referred to as a "cradle"), which may interface with contacts of the wireless control panel 116 through which the docking station supplies power to recharge the battery of the wireless control panel 116. The wireless control panel 116 may be water resistant, so that handling the wireless control panel 116 with wet hands or incidental splashing of the wireless control panel 116 will not substantially damage the device. The wireless control panel 116 may include an electronic screen that may display a user interface through which a user may interact with the control system load center 102 and the pool/spa devices 110. For example, the electronic screen of the wireless control panel 116 may be a capacitive touch screen.

The QuickTouch remote 120 may be similarly wirelessly coupled to the wireless transceiver 114 according to a similar or the same protocol as used by the wireless control panel 116. In some embodiments, the QuikTouch remote 120 may communicate with the wireless transceiver 114 via a default or user-defined "remote channel", which may correspond to a particular radio frequency (RF) communication frequency or frequency band. The QuickTouch remote may include a finite number of buttons, rather than a screen with a user interface. Each button of the Quick-Touch remote may be programmed (e.g., via the user interface accessible via the wireless control panel 116, the indoor control panel 126, and/or or local or remote user devices 127, 128, 130, 134) to, in response to being pressed, cause a defined operation of one or more of the pool/spa devices 110 to be performed. For example, a given button of the QuickTouch remote may be configured to increase or decrease a temperature of a spa via control of one or more of the heaters 146, to activate, deactivate, or otherwise control the pool or spa lights 148 (e.g., initiating, in some embodiments, the performance predefined "light shows" by groups of lights of the pool/spa devices 110, as will be described), to activate or de-activate the pool and/or spa jets 154, and/or to cause any other applicable function of the pool/spa devices 110 to be performed.

Figure 2:
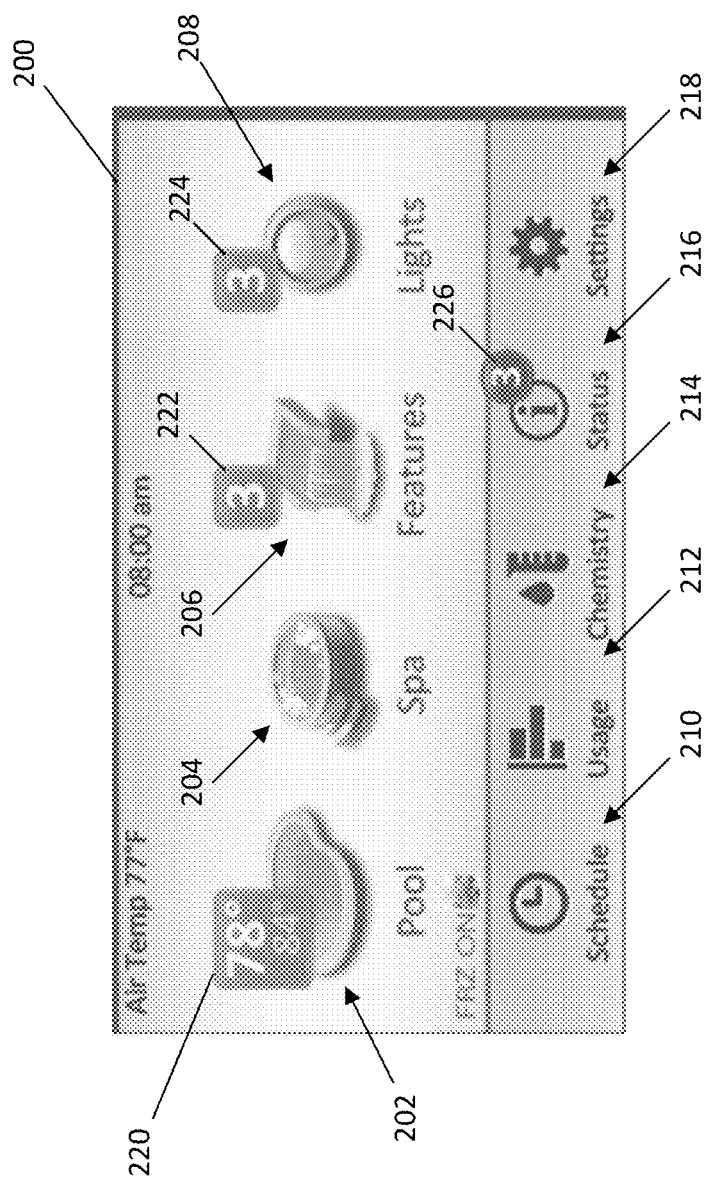
FIG. 2 is an illustrative home screen of a user interface that may be shown via an electronic display of a local or remote user device or control panel, which may facilitate the monitoring and control of connected devices in and around a pool/spa, in accordance with an embodiment.

FIG. 2 shows an illustrative home screen 200 of a user interface which may be displayed on an electronic screen of a computing device (e.g., the wireless control panel 116, the indoor control panel 126, and/or or local or remote user devices 127, 128, 130, 134 of FIG. 1A). As shown, the home screen 200 may include a number of icons 202, 204, 206, 208, 210, 212, 214, 216, 218, 220, 222, 224, 226.

Icon 202, shown as a pool in the present example, may be selected by a user to access a pool screen of the user interface. At the pool screen, for example, operation of the pool filter pump (e.g., of pumps 144 of FIG. 1B) may be controlled, operation of one or more heaters (e.g., of heaters 146 of FIG. 1B) may be turned on/off, the temperature of the pool may be set to a defined temperature (e.g., a setpoint temperature), and/or restrictions on the pool pump may be overridden while a freeze protection mode is active (as will be described).

Icon 204, shown as a spa in the present example, may be selected by a user to access a spa screen of the user interface. At the spa screen, for example, operation of the spa pump (e.g., of pumps 144 of FIG. 1B) may be controlled, operation of one or more heaters (e.g., of heaters 146 of FIG. 1B) may be turned on/off, a spa water temperature setpoint may be defined and/or restrictions on the pool pump may be overridden while the freeze protection mode is active (as will be described).

Icon 206, shown as a waterfall feature in the present example, may be selected by a user to access a feature screen of the user interface. At the feature screen, individual feature circuits or groups of feature circuits may be controlled (e.g., turned on and off).

As described above, a user or service technician may define one or more feature circuits via the user interface (e.g., of wireless control panel 116, the indoor control panel 126, and/or or local or remote user devices 127, 128, 130, 134 of FIG. 1A). These feature circuits may allow advanced functions to be selectively performed without wasting valuable relay outputs or auxiliary (AUX) circuits. Additionally, feature circuits provide flexibility in that they may be added or deleted via interaction with the user interface, which may not be possible for auxiliary circuits (e.g., without adding or removing a physical expansion panel/card).

For example, a feature circuit may be assigned for controlling multiple valve actuators (e.g., smart valves 142 of FIG. 1A) in a system. A feature circuit may be assigned (i.e., programmed) as a way to select the speed of a 2-speed or other variable speed filter pump (e.g., pumps 144 of FIG. 1A). A feature circuit may also be assigned to activate a spa spillway effect, where in a pool/spa combination (e.g., pool and/or spa 112 of FIG. 1A), the pool water can be diverted to the spa and then spill back to the pool. For example, multiple circuits corresponding to one or more pool/spa devices (e.g., pool/spa devices 110 of FIG. 1A) may be assigned to a given feature circuit, with logic associated with (e.g., programmed for) the feature circuit defining the operation of pool/spa device circuits assigned to the feature circuit (e.g., at defined times, under defined conditions, etc.). Here, a "pool/spa device circuit" may refer to an electric circuit that controls whether one or more corresponding pool/spa devices are turned on or off, may refer to an electric circuit that controls the speed of a variable speed pump, and/or may refer to an electric circuit that controls a characteristic (e.g., light color, level of valve actuation) of a pool/spa device.

When defining a feature circuit, each circuit assigned to the feature circuit may be defined as "on," "off," or "undefined" (e.g., "don't care"), such that, when a given feature circuit is activated, all circuits of the feature circuit defined as "on" may be turned on, all circuits of the feature circuit defined as "off" may be turned off, and all circuits of the feature circuit that are "undefined" may be left unchanged.

In some embodiments, a feature circuit group may be defined for a number of feature circuits. The feature circuit group may allow multiple feature circuits to be turned on and/or off with a single button press at the user interface, by activating or deactivating the feature circuit group via the single button press.

A "valve actuators" screen can be provided in the user interface for configuring valve actuators to be controlled by one or more feature circuits. The system (e.g., the control system load center 102 of FIGS. 1A and 1B) can drive one or more auxiliary valve actuators for applications such as solar heating and water features.

Icon 208, shown as a pool light in the present example, may be selected by a user to access a light screen of the user interface. At the light screen, individual lights or defined groups of lights may be selectively controlled. An example of the light screen is described below (e.g., in connection with FIG. 3). For example, individual or groups of color lights may be turned on or off, color set, color sync, and color swim features may be selectively activated, and preset light shows may be activated. Color set, color sync, and color swim features are described below (e.g., in connection with FIGS. 5-7).

Icon 210, shown as a clock in the present example, may be selected by a user to access a schedule screen of the user interface. At the schedule screen, daily pool/spa operations (e.g., operations of the pool/spa devices 110 of FIGS. 1A, 1B) may be schedule to occur during time periods that may be defined by the user. In addition to a "normal" daily pool/spa operational schedule, a separate "vacation mode" daily pool/spa operational schedule may be defined by the user via the schedule screen, or a sub-screen thereof. This vacation mode schedule may be active only when a user initiates vacation mode (e.g., via selection of a vacation mode button displayed on the schedule screen of the user interface).

Icon 212, shown as a bar chart in the present example, may be selected by a user to access a usage screen of the user interface. At the usage screen, usage data (e.g., for one or more of the pool/spa devices 110 of FIG. 1A, 1B), and/or a sensor data may be displayed. The displayed sensor data may be include data collected from sensors (e.g., sensors 150 of FIG. 1B) that are coupled to pool/spa devices and/or that are disposed in the general area of the pool and/or spa (e.g., ambient temperature sensors) over time. The usage data and the sensor data may be stored locally on one or more memory devices of one or more local computer systems and/or remotely on one or more memory devices of one or more remote computer systems (e.g., local user devices 127 and/or servers 136, 137 of FIG. 1A). For example, the usage data may include heater usage (e.g., gas heater usage, heat pump usage, hybrid heater usage), pump usage (e.g., pool pump usage, spa pump usage, automatic cleaner pump usage), chemical feed time (e.g., pH feed time, oxidation-reduction potential (ORP) feed time), and/or pump speed (e.g., for variable speed pumps). For example, the sensor data may include air temperature (e.g., measured by an ambient temperature sensor of the sensors 150 of FIG. 1B), pool water temperature (e.g., measured by a water temperature sensor of the sensors 150 of FIG. 1B), spa water temperature (e.g., measured by a water temperature sensor of the sensors 150 of FIG. 1B), solar temperature (e.g., measured by a temperature sensor of the sensors 150 of FIG. 1B that is in thermal communication with a solar panel of a solar heater coupled to the pool and/or spa), pH level data (e.g., measured by a pH sensor of the sensors 150 of FIG. 1B, which may be coupled to or integrated with a chemical controller, such as chemical controller 140 of FIG. 1B), and/or ORP level data (e.g., measured by a ORP sensor of the sensors 150 of FIG. 1B, which may be coupled to or integrated with a chemical controller, such as chemical controller 140 of FIG. 1B). These examples of usage data and sensor data are intended to be illustrative and not limiting. If desired, other applicable usage and/or sensor data may be collected, stored, and displayed on the usage screen.

The displayed usage data and sensor data may be displayed as a graph, group of graphs, and/or as a list, and may correspond to a selected time period (e.g., with only usage and sensor data corresponding to the selected time period being displayed). The user may be provided with multiple options via the usage screen that allow the selection of a type of usage data or sensor data to view and a time period over which to view the selected data (e.g., which may be defined in days, weeks, months, or years). In some embodiments, the options may include an option for the display of two or more selected types of usage data and/or sensor data to display on a single graph (e.g., which may be used to compare the data of the selected types). As an example, a user may select average daily air temperature and daily gas heater usage to be displayed on a single graph of the usage screen over a period of one month. In some embodiments, the options may include an option for the display of a single type of usage data or sensor data for two selected time periods (e.g., the two most recent, consecutive time periods) overlaid on a single graph. In some embodiments, multiple individual graphs, each corresponding to a different type of usage data or sensor data and a selected time period, may be shown together on the usage screen.

Figure 3A:
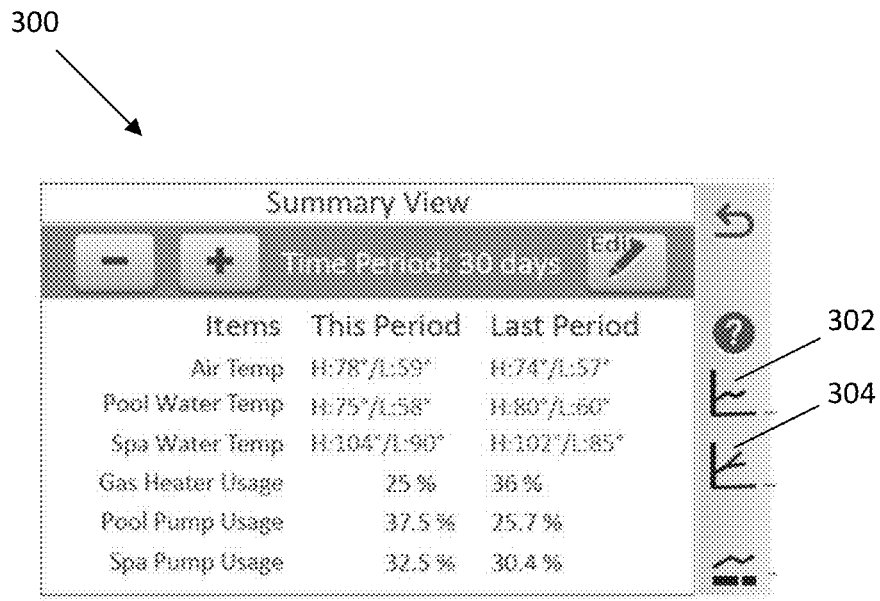
FIG. 3A is an illustrative usage screen showing a summary view of various usage data parameters and sensor data parameters over two consecutive periods, in accordance with an embodiment.

An example of a usage screen 300 that includes a summary view of usage and sensor data, (e.g., which may be accessed via selection of the icon 212 of FIG. 2) is shown in FIG. 3A. As shown, the usage screen 300 provides a comparative listing of air temperature, pool water temperature, spa water temperature, gas heater usage, pool pump usage, and spa pump usage for a current 30-day period and for a preceding 30-day period. The usage screen 300 includes a graph icon 302 which, when selected, causes a graph of a user-selected usage data type or sensor data type to be displayed over a defined time period, and a comparative graph icon 304 which, when selected, causes a comparative graph of two or more user-selected usage data types and/or sensor data types to be displayed over a defined time period.

Figure 3B:
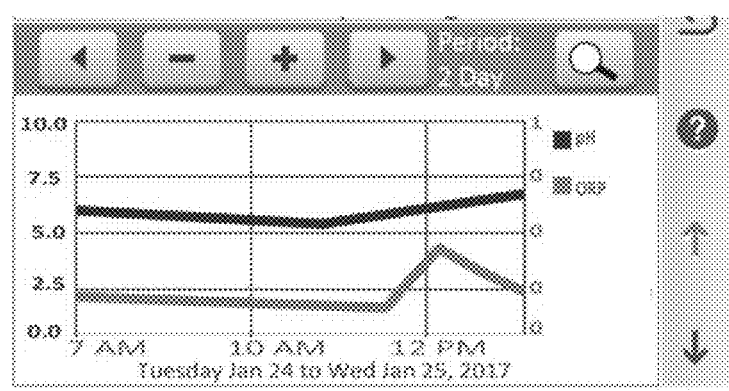
FIG. 3B is an illustrative usage screen showing a graphical view of pH level compared to ORP level for a pool or spa over a two day period, in accordance with an embodiment.

FIG. 3B shows an example of a usage screen 306 (e.g., which may be accessed via selection of a comparative graph icon 304 on the usage screen 300 of FIG. 3) that includes a comparative graph view of detected ORP values (e.g., on a scale of 0 to 1 volts) to detected pH values (e.g., on a scale of 0-10) over a two day period.

Returning to FIG. 2, icon 214, shown as a droplet and test tube in the present example, may be selected by a user to access a chemistry screen of the user interface. At the chemistry screen, the current pH, ORP, water balance, and salt content of the water are displayed. In some embodiments, a tank indicator may be shown, representing the level of acid (e.g., muriatic acid) present in the chemical controller system of the pool/spa. From the chemistry screen, a user may adjust a pH setpoint, adjust water balance settings (e.g., salt level, calcium hardness, alkalinity, and cyanuric acid level), adjust chlorine output to one or more bodies of water (e.g., pools/spas), and/or adjust an ORP level set point, and adjust the level of the tank indicator to match the actual level of the corresponding acid tank. In some embodiments, alerts may be shown on the chemistry screen, which may include chlorine tank salt level alerts (e.g., corresponding to low detected salt level in the chlorine tank of the chemical control system, below a predefined threshold), water salt level alerts (e.g., corresponding to low detected salt level in parts per million in the water of the pool and/or spa), PH level alerts (e.g., that occur when detected pH level is outside of a predefined range, such as 7.2 to 7.8), and/or ORP level alerts (e.g., that occur when detected ORP level is outside of a predefined range, such as 400 mV to 800 mV).

Icon 216, shown as a letter "i" in the present example, may be selected by a user to access a status/alerts screen of the user interface. The status/alerts screen may display the current system status, warnings, and alerts. For example, a color coded system may be employed, where warnings (e.g., low voltage conditions, system power loss, device communication loss, pool/spa chemical imbalances, and the like) are shown with a red indicator, caution alerts (e.g., chemical feeder errors, low chemical tank levels, and the like) are shown with an orange indicator, system status conditions (e.g., heater cool-down delays, informational pump speed and/or power usage, and the like) are shown with a blue indicator, and a green indicator is shown when no warnings/alerts/errors have been detected. In some embodiments, the particular types of alerts and status information generated by the system and shown at the status/alerts screen may be selectively enabled via the user interface. For example, the user may be provided with a list of alert types and status information types via the user interface, and may selectively enable or disable each alert type and status information type.

Icon 218, shown as a gear in the present example, may be selected by a user to access a settings screen of the user interface. The settings screen may provide a user with a number of options for viewing and potentially changing settings of the control system. For example, the settings screen may include options for the initiation of a vacation mode, the initiation of a service mode, accessing and viewing of support information, altering general settings such as touchscreen settings, location, date/time, units, features, lights list order, backlight setting, temperature sensor calibration, day/night themes, manual operation priority, and chemistry readings, accessing the alerts and notifications screen, defining security settings such enabling passcode protection for the control system and establishing administrator and guest passcodes, creating or logging into a user account of a web portal, viewing and/or editing light groups/feature circuits/feature circuit groups, rebooting the system (e.g., rebooting the control system load center 102 of FIGS. 1A, 1B), setting up remotes, configuring the system (e.g., the control system load center 102 of FIGS. 1A, 1B) as part of an installation setup, configuring a communications network (e.g., in communication with the control system load center 102 of FIG. 1A, 1B) such as an Ethernet or wireless network, wireless remote setup, defining delay settings (e.g., for valves, heater cool down, override delays, etc.), viewing system information, importing and/or exporting system configurations and status logs, restoring factory default settings of the system, and/or initiating a setup "wizard" to configure the system with a step-by-step digital assistant.

Icon 220, shown partially overlapping the icon 202, may show the temperature of a corresponding pool, and a temperature setpoint. When a heater of the pool is turned off, the temperature setpoint may be omitted from the icon 220. While not shown in the present example, an icon that is similar to icon 220 may be displayed overlapping the icon 204, which may show the temperature of a corresponding spa and a temperature setpoint.

Icon 222, shown partially overlapping the icon 206, may show a number representing the number of connected features that are presently active (e.g., that have been manually switched on).

Icon 224, shown partially overlapping the icon 208, may show a number representing the number of connected lights that are presently active (e.g., that have been manually switched on).

Icon 226, shown partially overlapping the icon 216, may show a number representing the number of unresolved alerts/warnings (sometimes referred to herein as alert data) that have been generated for the control system.

Figure 4:
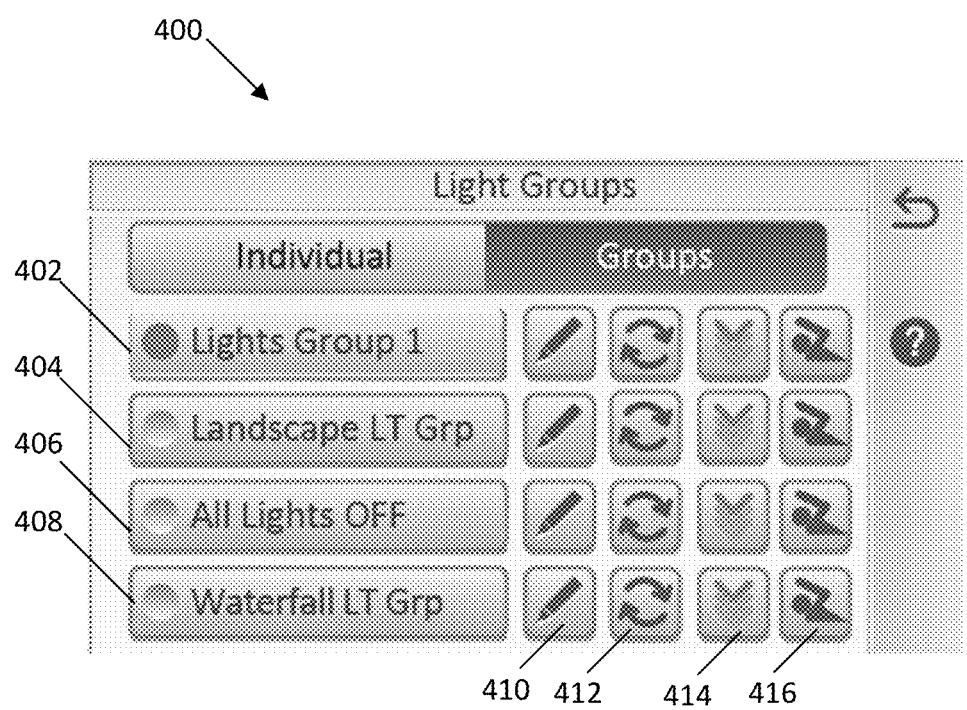
FIG. 4 is an illustrative light group control screen of a user interface that may be shown via an electronic display of a local or remote user device or control panel, through which groups of connected light circuits may be selected and controlled to perform various user defined and/or predefined functions, in accordance with an embodiment.

FIG. 4 shows an illustrative light screen 400 (e.g., which may be accessed via the selection of the icon 208 of FIG. 2) of a user interface which may be displayed on an electronic screen of a computing device (e.g., the wireless control panel 116, the indoor control panel 126, and/or or local or remote user devices 127, 128, 130, 134 of FIG. 1A). As shown, the light screen 400 may include light group selection buttons 402, 404, 406, 408, light group edit buttons 410 for each light group, sync buttons 412, set buttons 414, and swim buttons 416.

For example, the light group selection button 404 may be defined to correspond to a group of lights located in and around the landscape in the general area of a pool and/or spa. The light group selection button 408 may be defined to correspond to all lights located on and/or around a waterfall feature of the pool/spa. When one of the light group selection buttons 402, 404, 406, 408 is selected by a user via interaction with the user interface, the corresponding lights of that light group will activate or deactivate according to a preset function defined for that light group (e.g., turning all lights in the group on or off, switching colors of all lights in the group, starting a light show with the lights in the group in which the lights may be turned on and off and/or may change color according to a predefined sequence, etc.).

The light group edit button 410, when selected, may bring up a light group settings screen in which the colors of one or more individual lights in the corresponding light group may be selected, and in which lighting mode may be changed (e.g., from fixed color mode to light show mode in which a light show may be performed by the lights of the light group).

The light group sync button 412, when selected, may activate a sync function in which all lights in the group are synchronized to a common color at the beginning of a predefined color rotation, and a light color rotation (e.g., in a predefined sequence defined by color wheels of the lights) begins after a delay (e.g., a delay of 21 seconds).

Figure 5:
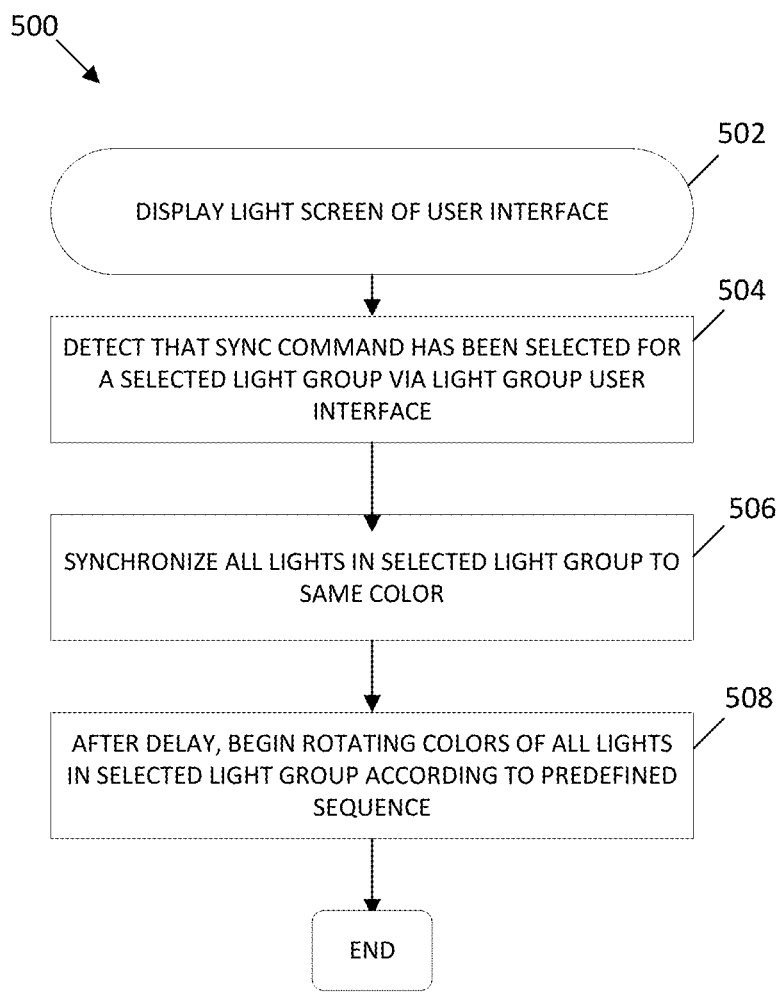
FIG. 5 is a flow chart of an example embodiment of a method by which all light circuits of a selected light group may be synchronized and rotated in response to a sync command.

FIG. 5 shows an illustrative process flow for a method 500 by which a sync function may be performed by a light group in response to a "sync" command. At step 502, a light screen (e.g., light screen 400 of FIG. 4) may be displayed on a user interface shown on an electronic screen of a local or remote control device (e.g., control panels 116, 126 or user devices 127, 128, 130, 134 of FIG. 1A) in electronic communication with a pool/spa control system. Essentially, the sync function may set all lights in the light group to the same color and may cause these lights to begin rotating at the same rate at the same time. The lights of the light group may each include a color wheel (e.g., a rotating wheel having different sections corresponding to color filters of different colors, such that when a given color filter is aligned with the light source of a particular light, the light color output by that light will correspond to the color of the given color filter) that, when rotated, causes the lights to change color according to a predefined sequence.

At step 504, a control system processor (e.g., control system processor 103 of control system load center 102 of FIGS. 1A, 1B) may detect/determine that a sync command has been selected (e.g., in response to selection of the light group sync button 412 of FIG. 4), corresponding to a selected light group.

At step 506, the control system processor may cause all lights in the selected light groups to be set (i.e., synchronized) to the same color. This color may correspond to the beginning of a predefined color rotation (e.g., a defined "beginning color" of the light wheel), in some embodiments.

At step 508, after a predefined delay, the control system processor may cause the colors of all lights in the selected light group to begin rotating according to a predefined sequence (e.g., of the light wheel).

The method 500 may be executed, at least in part, using a local device communicating with the control system via one or more local wireless connections or networks, or may be executed using a remote device communicating with the control system via a WAN and/or the internet. Additionally, in some embodiments in which a remote device is used in the execution of the method 500, one or more physical and/or virtual servers may facilitate communication between the remote device and the control system.

Returning to FIG. 4, the light group swim button 416, when selected, may activate a sync function in which all lights in the group are synchronized to a common color at the beginning of a predefined color rotation, and a light color rotation (e.g., in a predefined sequence according to a color wheel) begins after a delay (e.g., a delay of 21 seconds).

Figure 6:
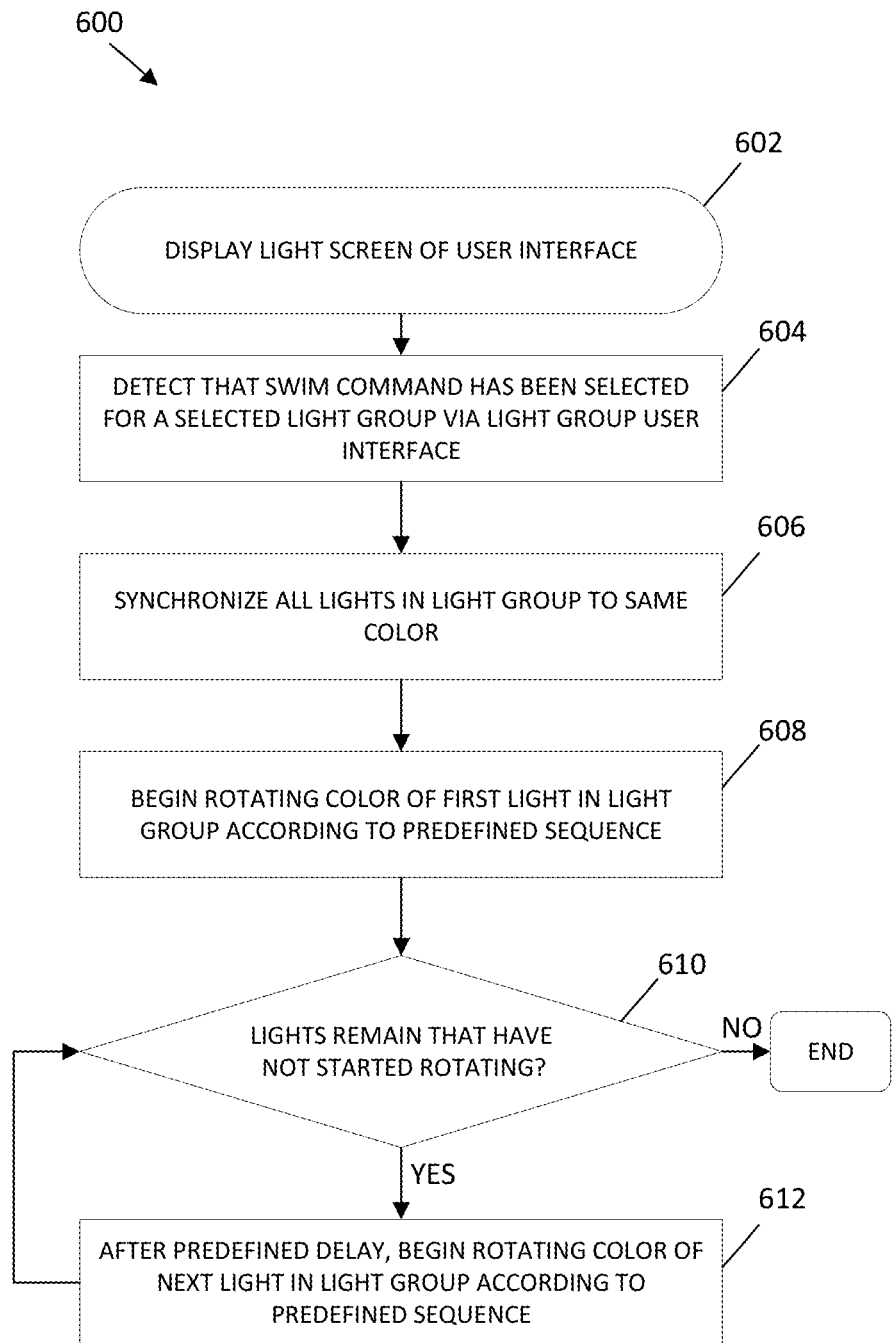
FIG. 6 is a flow chart of an example embodiment of a method by which all light circuits of a selected light group may be synchronized and rotated in a predefined sequence, with delays being applied between the rotations of consecutive lights in the light group in response to a swim command.

FIG. 6 shows an illustrative process flow for a method 600 by which a swim function may be performed for a light group in response to a "swim" command. At step 602, a light screen (e.g., light screen 400 of FIG. 4) may be displayed on a user interface shown on an electronic screen of a local or remote control device (e.g., control panels 116, 126 or user devices 127, 128, 130, 134 of FIG. 1A) in electronic communication with a pool/spa control system.

At step 604, a control system processor (e.g., control system processor 103 of control system load center 102 of FIGS. 1A, 1B) may detect/determine that a swim command has been selected (e.g., in response to selection of the light group swim button 416 of FIG. 4), corresponding to a selected light group.

At step 606, the control system processor may cause all lights in the selected light group to be set (i.e., synchronized) to the same color. This color may correspond to the beginning of a predefined color rotation, in some embodiments.

At step 608, the control system processor may cause (e.g., via electronic communication) a first light of the light group to begin rotating according to a predefined sequence. For example, the predefined sequence may correspond to the predefined color rotation of a color wheel.

At step 610, the control system processor may determine whether there are lights remaining in the light group that have not begun rotating. If are all lights in the light group are determined to have begun rotating, the method 600 ends. The lights of the light group may continue to rotate according to the predefined sequence after the method 600 ends. If at least one light of the light group is determined to have not begun rotating, then the method 600 proceeds to step 612.

At step 612, after a predefined delay (e.g., defined in a memory device of the control system load center 102 of FIG. 1), the control system processor may cause (e.g., via electronic communication) a new light in the light group to begin rotating according to the predefined sequence. Here, the "new light" refers to a light of the light group that has not begun rotating immediately prior to the execution of step 612. In some embodiments, the light group may be organized as an ordered list (e.g., in a memory device of the control system load center 102 of FIG. 1), where the order in which new lights begin rotating corresponds to the order of lights provided in the ordered list. By delaying the rotation of each light in the light group in a particular order, a "swim" effect may be created in which different colors of light appear to be "swimming" across the water of the pool or spa as the lights in the light group rotate colors.

The method 600 may be executed, at least in part, using a local device communicating with the control system via one or more local wireless connections or networks, or may be executed using a remote device communicating with the control system via a WAN and/or the internet. Additionally, in some embodiments in which a remote device is used in the execution of the method 600, one or more physical and/or virtual servers may facilitate communication between the remote device and the control system.

Returning to FIG. 4, the light group set button 414, when selected, may activate a set function in which all lights in the group are synchronized to a default color or a set of default colors.

Figure 7:
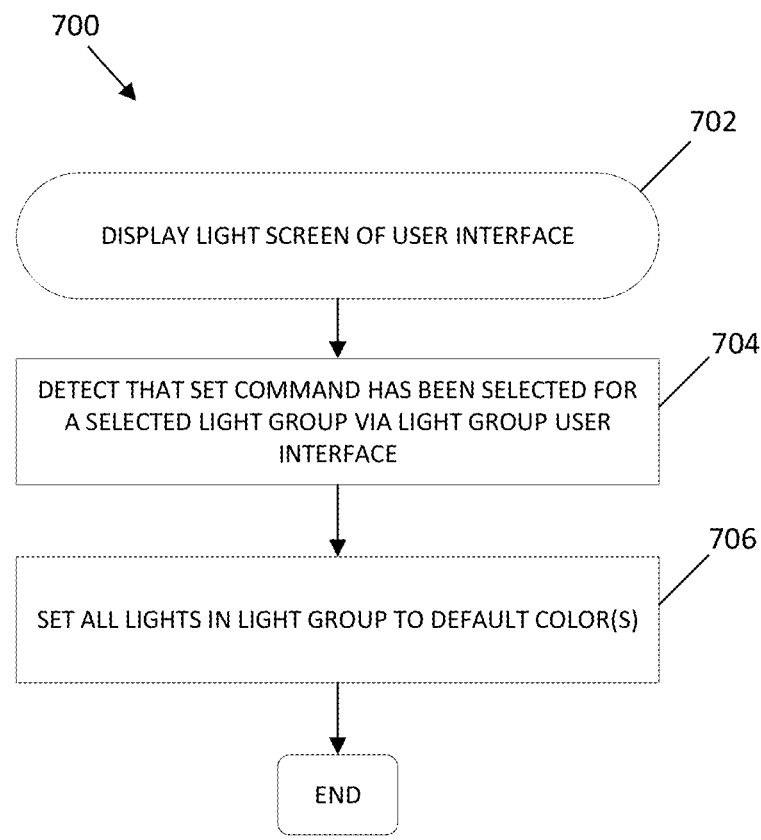
FIG. 7 is a flow chart of an example embodiment of a method by which all light circuits of a selected light group may be set to the same color in response to a set command.

FIG. 7 shows an illustrative process flow for a method 700 by which a set function may be performed for a light group in response to a "set" command. At step 702, a light screen (e.g., light screen 400 of FIG. 4) may be displayed on a user interface shown on an electronic screen of a local or remote control device (e.g., control panels 116, 126 or user devices 127, 128, 130, 134 of FIG. 1A) in electronic communication with a pool/spa control system.

At step 704, a control system processor (e.g., control system processor 103 of control system load center 102 of FIGS. 1A, 1B) of a pool/spa control system may detect/determine that a set command has been selected (e.g., in response to selection of the light group set button 414 of FIG. 4), corresponding to a selected light group.

At step 706, the control system processor may cause (e.g., via electronic communication) all lights in the selected light group to be set to a default color. For example, prior to selecting the set command, the user may define (e.g., via a settings screen accessed via icon 218 of FIG. 2) a single default color or to which the lights in the selected light group are to be set in response to the set command. In this way, the lights of the light group may cause all lights in the light group to be set to a single predefined color in response to a single user command (e.g., a single press of the light group set button 414).

The method 700 may be executed, at least in part, using a local device communicating with the control system via one or more local wireless connections or networks, or may be executed using a remote device communicating with the control system via a WAN and/or the internet. Additionally, in some embodiments in which a remote device is used in the execution of the method 700, one or more physical and/or virtual servers may facilitate communication between the remote device and the control system.

A user may define one or more feature circuits via the user interface associated with the control system. The feature circuits may assign programmed logic functions to one or more circuits of pool/spa devices (e.g., pool/spa devices 110 of FIGS. 1A, 1B), as described above.

In some embodiments, a "freeze protection" feature may be enabled for one or more pool/spa device circuits and/or feature circuits, such that corresponding freeze protect logic may protect the associated pool/spa devices when temperatures drop to or below freezing and a freeze protection mode is activated. For example, while freeze protection mode is active, the system (e.g., a processor thereof) may cause one or more pumps (e.g., of pumps 144 of FIG. 1B) to run and for one or more valves actuators to open their corresponding valves when a temperature sensor (e.g., of sensors 150 of FIG. 1B) detects that an ambient temperature has fallen below a predefined temperature threshold (e.g., ≤36° F.), such that water runs through some or all of the pipes of the pool/spa system, potentially preventing these pipes from freezing and/or bursting. The freeze protection mode may continue to be active until the freeze condition is determined to have ended (e.g., (e.g., ambient temperature >36° F.). Freeze protection may be enabled or disabled (e.g., by turning freeze protection "ON" or "OFF") by a user via a corresponding settings screen (e.g., accessible via selection of icon 218 of FIG. 2) of a user interface of a local or remote control device (e.g., control panels 116, 126 or user devices 127, 128, 130, 134 of FIG. 1A). In some embodiments, freeze protection for a given pool/spa device may be overridden in response to a user interaction with the user interface of a control device (e.g., control panels 116, 126 or user devices 127, 128, 130, 134 of FIG. 1A).

Figure 8:
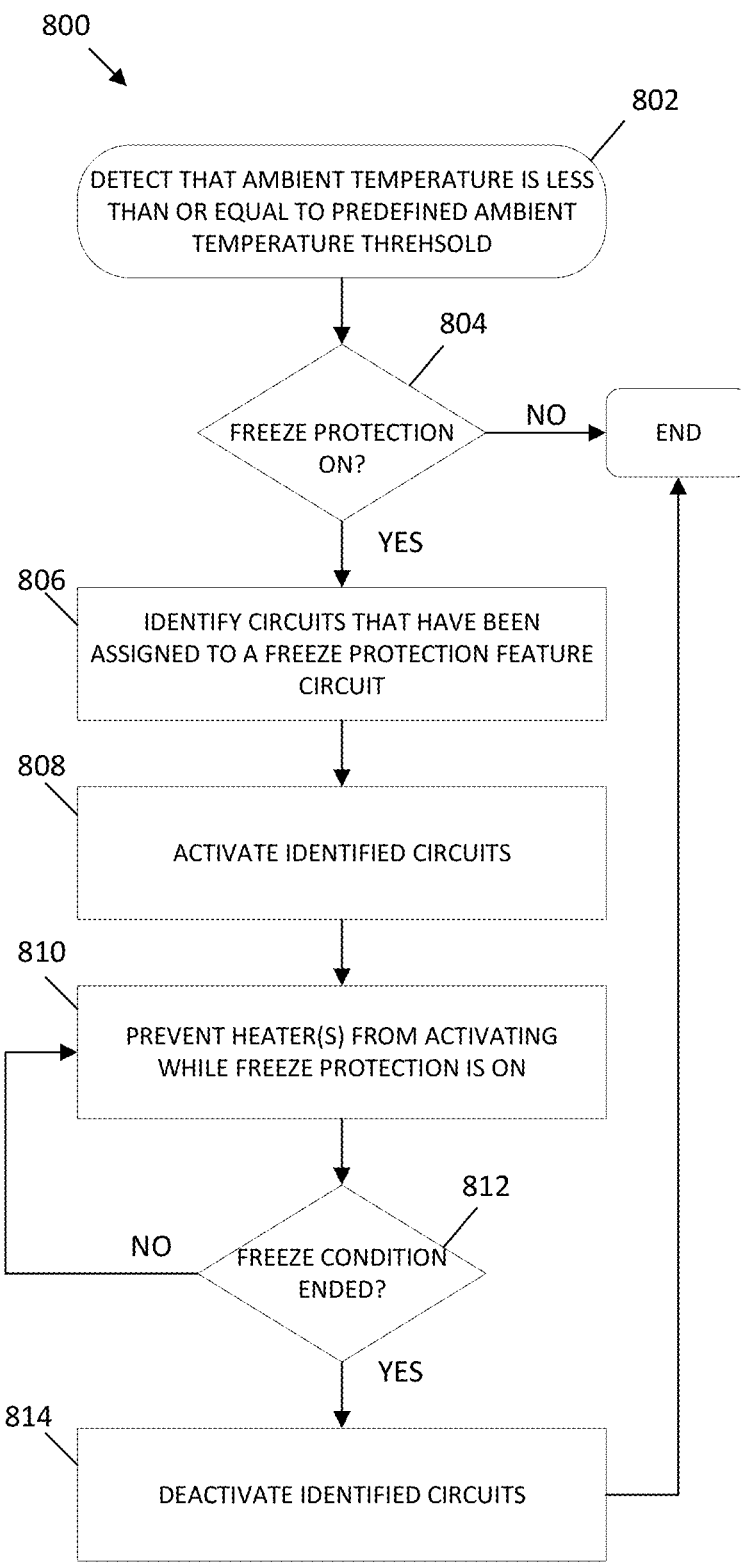
FIG. 8 is a flow chart of an example embodiment of a method by which all circuits that are assigned freeze protection may be activated in response to detecting a sufficiently low ambient temperature when a freeze protection setting is active.

FIG. 8 shows an illustrative process flow chart for a method 800 by which a freeze protection mode (e.g., control system state) may be automatically activated and deactivated based on detected ambient temperatures. At step 802, a control system processor (e.g., control system processor 103 of control system load center 102 of FIGS. 1A, 1B) of a pool/spa control system may determine that the ambient temperature in the region of a pool/spa (e.g., pool and/or spa 112 of FIG. 1A) associated with the control system is at or below a predefined ambient temperature threshold (e.g., ≤36° F.). For example, in making this determination, the control system processor may compare the ambient temperature threshold to ambient temperature data received from an ambient temperature sensor (e.g., of sensors 150 of FIG. 1B) coupled to the control system.

At step 804, the control system processor may determine whether freeze protection is "ON" (e.g., whether a freeze protection setting is enabled). If freeze protection is "OFF" (e.g., disabled), the method 800 ends. Otherwise, if freeze protection is "ON", the method 800 proceeds to step 806.

At step 806, the control system processor identifies circuits (e.g., pool/spa device circuits) that have been assigned freeze protection (e.g., as defined in a memory of the control system load center 102 of FIG. 1A). For example, circuits corresponding to the control of various pumps (e.g., pumps 144 of FIG. 1B) and valve actuators (e.g., of smart valves 142 of FIG. 1B) may be assigned freeze protection. Some circuits may be assigned freeze protection by default, while other circuits may need to be assigned freeze protection via user interaction with the user interface.

At step 808, the control system processor activates (e.g., via electronic communication) the identified circuits. For example, the corresponding pumps may be activated and the corresponding valve actuators may be opened to cause water to flow through the pool/spa, thereby decreasing the likelihood that pipes of the pool/spa system will freeze and/or burst and potentially preventing such incidents entirely. In some embodiments, activating the identified circuits may correspond to the activation of a freeze protection mode.

At step 810, the control system processor may prevent heaters (e.g., heaters 146 of FIG. 1B) from automatically activating while the freeze protection mode is active. For example, if a heater is scheduled to activate at a time that the freeze protection mode happens to be active, the control system processor may prevent the heater from activating despite its activation being scheduled. In some embodiments, a user may override this prevention by manually activating the heater via a local or remote control device (e.g., control panels 116, 126 or user devices 127, 128, 130, 134 of FIG. 1A).

At step 812, while freeze protection mode is active, the control system processor may periodically check to determine whether the freeze condition has ended. For example, the control system processor may periodically compare the predetermined ambient temperature threshold to the ambient temperature data generated by the ambient temperature sensor to determine whether the ambient temperature has risen above the ambient temperature threshold, in which case the freeze condition may be considered to have ended. If the control system processor determines that the freeze condition has not ended, the method 800 may return to step 810, continuing to prevent the heater(s) from automatically activating. Otherwise, the method 800 may proceed to step 814.

At step 814, the control system processor may deactivate the identified circuits, effectively ending/deactivating the freeze protection mode. The method 800 may then end and normal operation of the control system may resume.

In some embodiments, a "master cleaner" feature (e.g., logic) may be defined for one or more pool/spa device circuits, which may define rules for the operation of an automatic cleaner and associated pool/spa devices. For example, the master cleaner feature may prevent an automatic cleaner pump (e.g., of the pumps 144 of FIG. 1B) from running without a corresponding filter pump (e.g., of the pumps 144 of FIG. 1B) first being activated. For example, the master cleaner feature may force the filter pump to turn on for a predetermined amount of time prior to a scheduled activation of the automatic cleaner pump, and remain on during the operation of the automatic cleaner pump. The master cleaner feature may automatically shut off the automatic cleaner pump and/or prevent the automatic cleaner pump from running whenever a spa pump (e.g., of the pumps 144 of FIG. 1B) is switched on. The master cleaner feature may automatically shut off the automatic cleaner pump when a solar heater (e.g. of heaters 146 of FIG. 1B) is activated and may prevent the automatic cleaner pump from being activated until either the solar heater is turned off or until a predetermined time period has elapsed.

Figure 9:
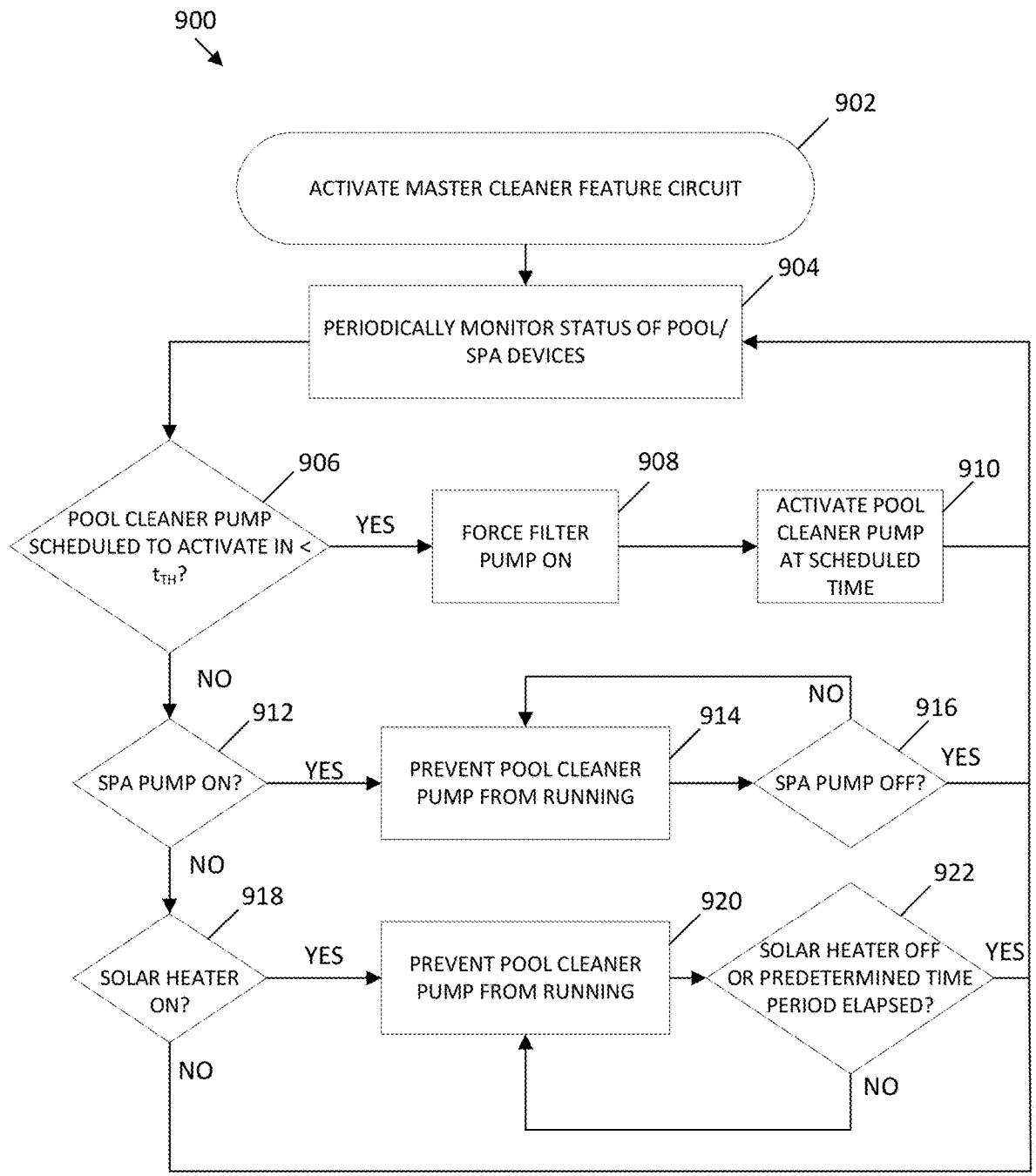
FIG. 9 is a flow chart of an example embodiment of a method by which predefined rules associated with the operation or prevention of operation of a pool cleaner pump may be implemented.

FIG. 9 shows an illustrative process flow chart for a method 900 by which functions of a master cleaner feature (e.g., control system state) may be performed. At step 902, a control system processor (e.g., control system processor 103 of control system load center 102 of FIGS. 1A, 1B) of a pool/spa control system determines that a master cleaner feature has been activated. For example, the master cleaner feature may be activated in response to a corresponding interaction between a user and a corresponding screen of user interface of a local or remote control device (e.g., control panels 116, 126 or user devices 127, 128, 130, 134 of FIG. 1A), or may be activated as a default setting of the control system.

At step 904, the control system processor periodically monitors status of pool/spa devices (e.g., pool/spa devices 110 of FIG. 1B) assigned to the master cleaner feature. For example, the control system processor may monitor when an automatic pool cleaner pump (e.g., of pumps 144 of FIG. 1B) corresponding to an automatic pool cleaner (e.g., automatic cleaner 156 of FIG. 1B) is scheduled to activate, may monitor the status of a spa pump (e.g., of pumps 144 of FIG. 1B), and may monitor the status of a solar heater (e.g., of heaters 146 of FIG. 1B).

At step 906, the control system processor determines, based on a pre-defined and/or user-defined schedule, whether the automatic pool cleaner pump is scheduled to activate sooner than a predetermined amount of time $t_{TH}$ (e.g., 5 minutes). If not, the method proceeds to step 912. If so, the method proceeds to step 908.

At step 908, the control system processor forces a filter pump (e.g., of pumps 144 of FIG. 1B) of the pool to activate.

At step 910, the control system processor activates the automatic pool cleaner pump at the scheduled time. In this way, the filter pump may be forced to run for the predetermined amount of time $t_{TH}$ (e.g., around 5 minutes) prior to the activation of the automatic pool cleaner pump. This may provide a priming delay for the automatic pool cleaner pump.

At step 912, the control system processor determines whether the spa pump is on. If the spa pump is on, the method 900 proceeds to step 914. If the spa pump is off, the method 900 proceeds to step 918.

At step 914, the control system processor prevents the automatic pool cleaner pump from running.

At step 916, the control system processor determines whether the spa pump is off. If the spa pump is not off, the method 900 returns to step 914 and the control system processor continues to prevent the automatic pool cleaner from running. If the spa pump is off, then the method 900 returns to step 904, and monitoring of the pool/spa devices associated with the master cleaner feature continues.

At step 918, the control system processor determines whether the solar heater is on. If the solar heater is on, the method 900 proceeds to step 920. If the spa pump is off, the method 900 returns to step 904, and monitoring of the pool/spa devices associated with the master cleaner feature continues. Step 918 may be skipped if the solar heater has been running uninterrupted for longer than the predetermined time period defined in step 922.

At step 920, the control system processor prevents the automatic pool cleaner pump from running.

At step 922, the control system processor determines whether the solar heater is off or if a predetermined time period (e.g., five minutes) has elapsed since the solar heater was turned on. If either both conditions are false, the method 900 returns to step 920 and the control system processor continues to prevent the automatic pool cleaner pump from running. If either condition is true, the method 900 returns to step 904 and monitoring of the pool/spa devices associated with the master cleaner feature continues.

It should be understood that steps 906, 908, and 910 may be performed in parallel with steps 912, 14, and 916, and with steps 918, 920, and 922, in some embodiments.

One or more pool/spa devices (e.g., pool/spa devices 110 of FIGS. 1A, 1B) coupled to a control system (e.g., coupled to control system load center 102 or expansion panels 108 of FIGS. 1A, 1B) may include on-board processing hardware that operates according to firmware stored on an associated memory device. Updated versions of this firmware may be released from time to time by device manufacturers. Conventionally, these firmware updates would need to be installed on the corresponding pool/spa device via a direct connection between a user's computer (on which the firmware update in question had previously been downloaded) and the pool/spa device itself. Depending on the location of the pool/spa device, such conventional methods may be inconvenient or impractical. However, with the control system of the present disclosure firmware updates may be automatically retrieved via a connection to a firmware update server via a WAN or the internet, and the control system may distribute the firmware update to the pool/spa device being updated. These automatic firmware updates may be performed with little or no input from a user, which may allow pool/spa devices to be easily maintained with the most up-to-date firmware.

Figure 10:
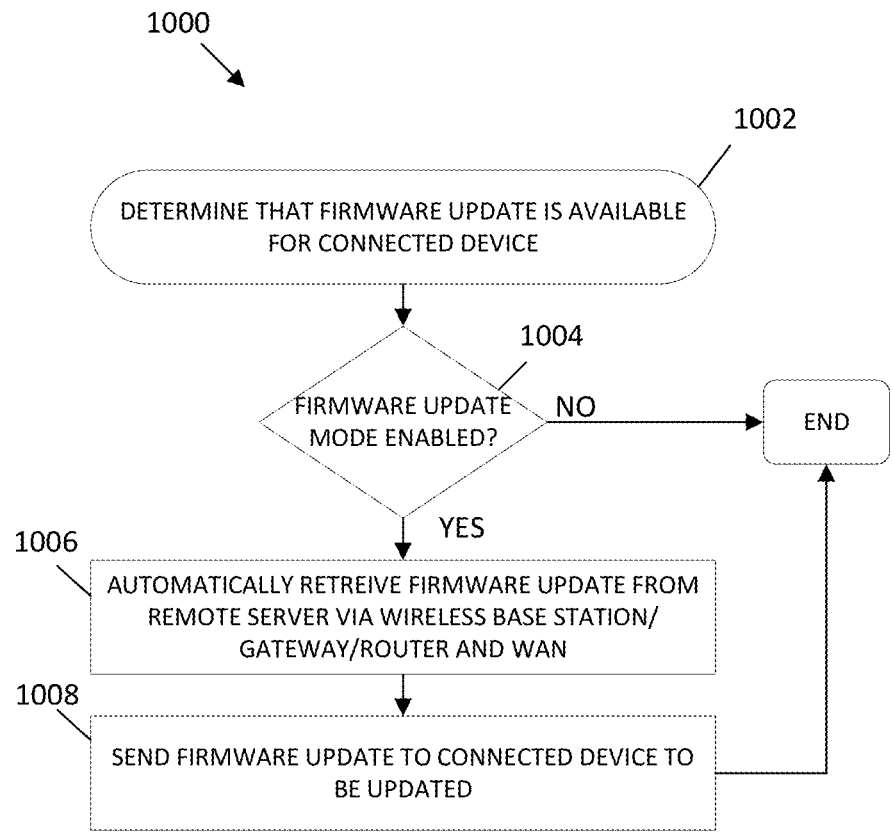
FIG. 10 is a flow chart of an example embodiment of a method by which a firmware update for a device connected to the control system may be retrieved and distributed via the control system load center.

FIG. 10 shows an illustrative process flow chart for a method 1000 by which a control system (e.g., control system load center 102 of FIGS. 1A and 1B) may identify the availability of, retrieve, and distribute, one or more firmware updates for pool/spa devices (e.g., pool/spa devices 110 of FIGS. 1A and 1B) coupled to the control system. At step 1002 a control system processor (e.g., control system processor 103 of FIG. 1A) of the control system may determine that a firmware update is available for a connected device (e.g., a pool/spa device). For example, the control system processor may periodically receive notifications of available firmware updates from a firmware server (e.g., one of servers 136, 137 of FIG. 1A) via a connection to the internet (e.g., internet/WAN cloud 132 of FIG. 1A) via a base station/gateway router (e.g., base station/gateway/router 124 of FIG. 1A) and a wireless transceiver (e.g., wireless transceiver 122 of FIG. 1A).

At step 1004, the control system processor may determine whether a firmware update mode of the control system is enabled. For example, the firmware update mode may be enabled via selection of a corresponding setting by a user via a corresponding setting screen (e.g., accessible via selection of icon 218 of FIG. 2) of a user interface of a local or remote control device (e.g., control panels 116, 126 or user devices 127, 128, 130, 134 of FIG. 1A). If the firmware update mode is enabled, the method 1000 proceeds to step 1006. If the firmware update mode is not enabled, the method 1000 ends.

At step 1006, the control system processor automatically retrieves the firmware update that was determined to be available at step 1002 from the firmware server (e.g., via the internet).

At step 1008, the control system processor sends the firmware update to a connected device (e.g., of pool/spa devices 110) to which the firmware update corresponds. For example, the control system processor may "push" the firmware update to the connected device.

Figure 11A:
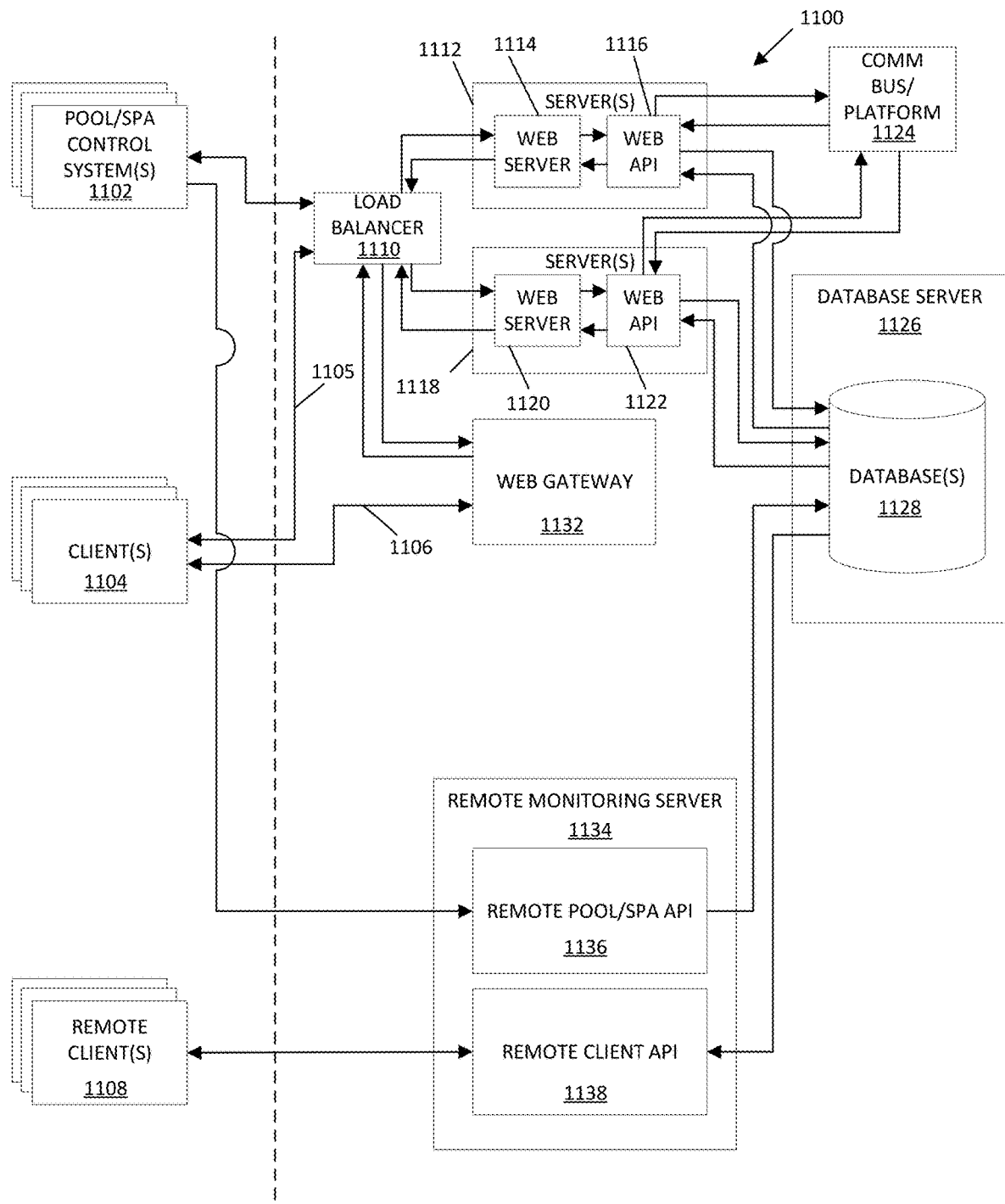
FIG. 11A is a block diagram of an example embodiment of an illustrative system architecture by which communication between back-end servers and front-end devices may be facilitated.

FIG. 11A shows an illustrative backend architecture 1100 that may facilitate the collection and storage of sensor data, usage data, and/or device status information from a pool/spa control system (e.g., corresponding to pool/spa devices 110; via control system load panel 102, wireless transceiver 122, base station/gateway/router 124, and internet/WAN cloud 132 of FIGS. 1A, 1B), the distribution of sensor data, usage data, and/or device status information to one or more client computer devices (e.g., user devices 127, 128, 130, 134 of FIG. 1A) for display on one or more user interface screens thereof (e.g., as part of a usage screen such as usage screens 300, 306 of FIGS. 3A and 3B), and/or the routing of commands received from client computer devices operating in a remote mode (e.g., user devices 127, 128, 130, 134, FIG. 1A) to the pool/spa control system.

As shown, the backend architecture 1100 may include a load balancer 1110, a first server or server cluster 1112, a second server or server cluster 1118, a communication bus/platform 1124, a database server 1126, a web gateway 1132, and a remote monitoring server or server cluster 1134. The first server or server cluster 1112 may include a web server 1114, which may be an Internet Information Services (IIS), and a web application programming interface (API) server 1116. The web server 1114 may be connected to the web API block 1116. In some embodiments, the functions of the web server 1114 and the web API server 1116 may be combined into a single server. The second server or server cluster 1118 may include a web server 1120 and a web API server 1122. The web server block 1120 may be connected to the web API server 1122. In some embodiments, the functions of the web server 1120 and the web API server 1122 may be combined into a single server. The database server 1126 may be a structured query language (SQL) server, and/or may include one or more databases 1128. The remote monitoring server or server cluster 1134 may include a remote pool/spa API server 1136 and a remote client API server 1138.

The first and second servers or server clusters 1112 and 1118 may be coupled, through the load balancer 1110, to one or more pool/spa control systems 1102 (e.g., corresponding to the control system load center 1102 of FIGS. 1A and 1B), and/or clients 1104. The pool/spa control systems 1102 and the clients 1104 may each connect to the first server or server cluster 1112 or the second server or server cluster 1118 via the load balancer 1110. For example, a given pool/spa control system 1102 may maintain a persistent connection to the web API server 1116 or the web API server 1122 via a "heartbeat" signal. The heartbeat signal may be periodically sent to the web API server 1116 or 1118, which may generate a heartbeat acknowledgment that is sent back to the given pool/spa control system 1102. The web API server may expect to receive a predetermined number of heartbeat signals from the given pool/spa control system 1102 in a given time period. The given pool/spa control system 1102 may expect to receive a heartbeat acknowledgement for each heartbeat signal sent by the given pool/spa control system

1102. If more than a predetermined number of expected heartbeat signals or heartbeat acknowledgements are lost (e.g., not received) over a given period, the connection between the pool/spa control system 1102 and the server or server cluster 1112 may be terminated (either by the given pool/spa control system 1102 or by the web API) and, in some embodiments, automatically reestablished (e.g., by the given pool/spa control system 1102). The given pool/spa control system 1102 may initiate the connection to the server or server cluster 1112, which may allow for the connection to be established without the need to reconfigure a firewall of the local network to which the given pool/spa control system 1102 is connected.

The load balancer 1110 may be implemented via software (e.g., as part of the web gateway 1132) or stand-alone hardware, and may route network traffic (e.g., received from the pool/spa control systems 1102 or the clients 1104) to either the first server or server cluster 1112, the second server or server cluster 1118, or another connected server or server cluster, according a scheduling algorithm. For example, the scheduling algorithm may identify which of the servers or server clusters 1112 or 1118 are the least busy (e.g., determined based on the number of established connections of each server/server cluster, average available bandwidth of each server/server cluster, how much traffic has recently been assigned to each server/server cluster, geographic location, capabilities, up/down status, least response times, reported load, etc.).

For example, initially, a given client of the clients 1104 may connect to a web gateway 1132 via an initially unsecure connection 1106 (e.g., corresponding to the hyper-text transfer protocol (HTTP)), which may authenticate the given client (e.g., using a username/password combination or a pre-shared key or token). If a given client 1104 fails to properly authenticate via the web gateway 1132, the web gateway 1132 may disallow the given client 1104 from connecting to the servers/server clusters 1112, 1118, 1126. In contrast, after successful authentication via the web gateway 1132, the given client 1104 may communicate with the server/server clusters 1112 or 1118 assigned via the load balancer 1110 using a secure connection 1105 (e.g., corresponding to a WebSocket communication protocol that provides full-duplex communication channels between devices over a single TCP connection), which may bypass the web gateway 1132. For example, the clients 1104 may include mobile user devices (e.g., mobile devices 128 of FIG. 1A), web browsers or dedicated applications running on personal computer devices (e.g., computing devices 130 of FIG. 1A), voice assistant clients, or other applicable clients.

The remote monitoring server or server cluster 1134 may be connected to the pool/spa control systems 1102, one or more remote viewer clients 1108 (e.g., mobile user devices, web browsers, dedicated applications running on personal computer devices, voice assistant clients, or other applicable clients), and the database server 1126. Specifically, the remote pool/spa API server 1136 may be coupled to the pool/spa control systems 1102 via respective TCP protocol connections, and may be communicatively connected to the database server 1126. The remote client API server 1138 may be connected to the remote viewer clients 1108 via respective HTTPS protocol connections, and may be connected to the database server 1126.

For example, the remote viewer clients 1108 may correspond to a computer system that is executing remote viewer software. The remote viewer software may display sensor data, usage data, pool/spa device state data, and/or alerts/alert data corresponding to one or more of the pool/spa control systems 1102 via a user interface (e.g., a "remote monitoring dashboard") shown on a given remote viewer client 1108, without allowing the given remote viewer client 1108 to issue commands to the one or more pool/spa control systems 1102 (although in some embodiments remote viewer clients may be assigned limited permissions to issue commands to the one or more pool/spa control systems 1102, such as to change chemical or temperature set points of the one or more pool/spa control systems 1102).

The remote monitoring server 1134 may provide a producer-consumer system. For example, the remote viewer clients 1108 (consumers) may retrieve system data (e.g., sensor data, pool/spa device status data, usage data, alerts/alert data, etc.) corresponding to one or more pool/spa control systems 1102 from the databases 1128 via the remote client API server 1138 (e.g., which retrieves the system data and pushes it to one or more of the remote viewer clients 1108). The pool/spa control systems 1102 (producers) may upload (e.g., push) system data to the databases 1128 via the remote pol/spa API 1136.

The web API server 1116 of the server or server cluster 1112 may be coupled to the database 1128 of the database server 1126. The web API server 1122 of the server or server cluster 1118 may also be coupled to the database 1128 of the database server 1126.

The web servers 1114 and 1120 (e.g., which may be an Internet Information Services server) may be configured to host the web applications displayed via a user interface of a given client 1104. The web API servers 1116 and 1122 may host server-side programmatic interfaces accessible via the web servers 1114 and 1120, respectively. For example, the web API implemented by one of the web API servers 1116 or 1122 handles requests and responses associated with the uploading of data to the databases 1128, the retrieval of data from the databases 1128, and the routing of data between the server or server cluster 1112 and the server or server cluster 1118.

For example, a given pool/spa control system 1102 may periodically provide system data (e.g., sensor data, pool/spa device status data, usage data, alerts/alert data, etc. related to the pool and/or spa devices to which it is connected) to the database(s) 1128 via one or more data paths that may include i) the load balancer 1110, the web server 1114, the web API server 1116, and the database server 1126; ii) the load balancer 1110, the web server 1120, the web API server 1122, and the database server 1126; and/or iii) the remote pool/spa API server 1136. For example, the given pool/spa control system 1102 may store all system data locally, and may periodically upload some or all of the locally stored system data to the databases 1128. In some embodiments, a given client 1104, if connected to a local network to which a given pool/spa control system 1102 is connected, may instead be operated in a "local" mode, in which, rather than retrieving system data from the databases 1128, the given client 1104 retrieves system data directly from the memory of the given pool/spa control system 1102 via the local network.

For example, a given client 1104 may retrieve system data (e.g., sensor data, pool/spa device status data, usage data, alerts/alert data, etc.) from the database(s) 1128 in order to display that data on a corresponding screen of the user interface of the given client 1104. The data path by which the database(s) 1128 may route the requested data to the given client 1104 may include i) the database server 1126, the web API server 1116, the web server 1114, and the load balancer 1110; and/or ii) the database server 1128, the web API server 1122, the web server 1120.

For example, a given remote viewer client 1108 may retrieve system data (e.g., sensor data, pool/spa device status data, usage data, alerts/alert data, etc.) from the database(s) 1128 in order to display that data on a corresponding screen of the user interface of the given remote viewer client 1108. The data path by which the database(s) 1128 may route the requested data to the given remote viewer client 1108 may include the database server 1126 and the remote client API server 1138.

For example, when an alert is triggered at a given pool/spa control system 1102, the given pool/spa control system 1102 sends alert data to the web API (web API 1116 or 1122) of the server or server cluster (server or server cluster 1112 or 1118) to which it has been assigned by the load balancer 1110. The web API may then distribute an alert to one or more user devices of the clients 1104 (e.g., which may depend on the types of alert notifications that have been enabled for the given pool/spa control system 1102). For example, the web API may cause an e-mail, text (short message service (SMS)) message, and/or push notification to be sent to a given client 1104 and/or may activate an alert icon shown on the user interface of the given client 1104, in response to alert data received from the given pool/spa control system 1102.

Figure 11B:
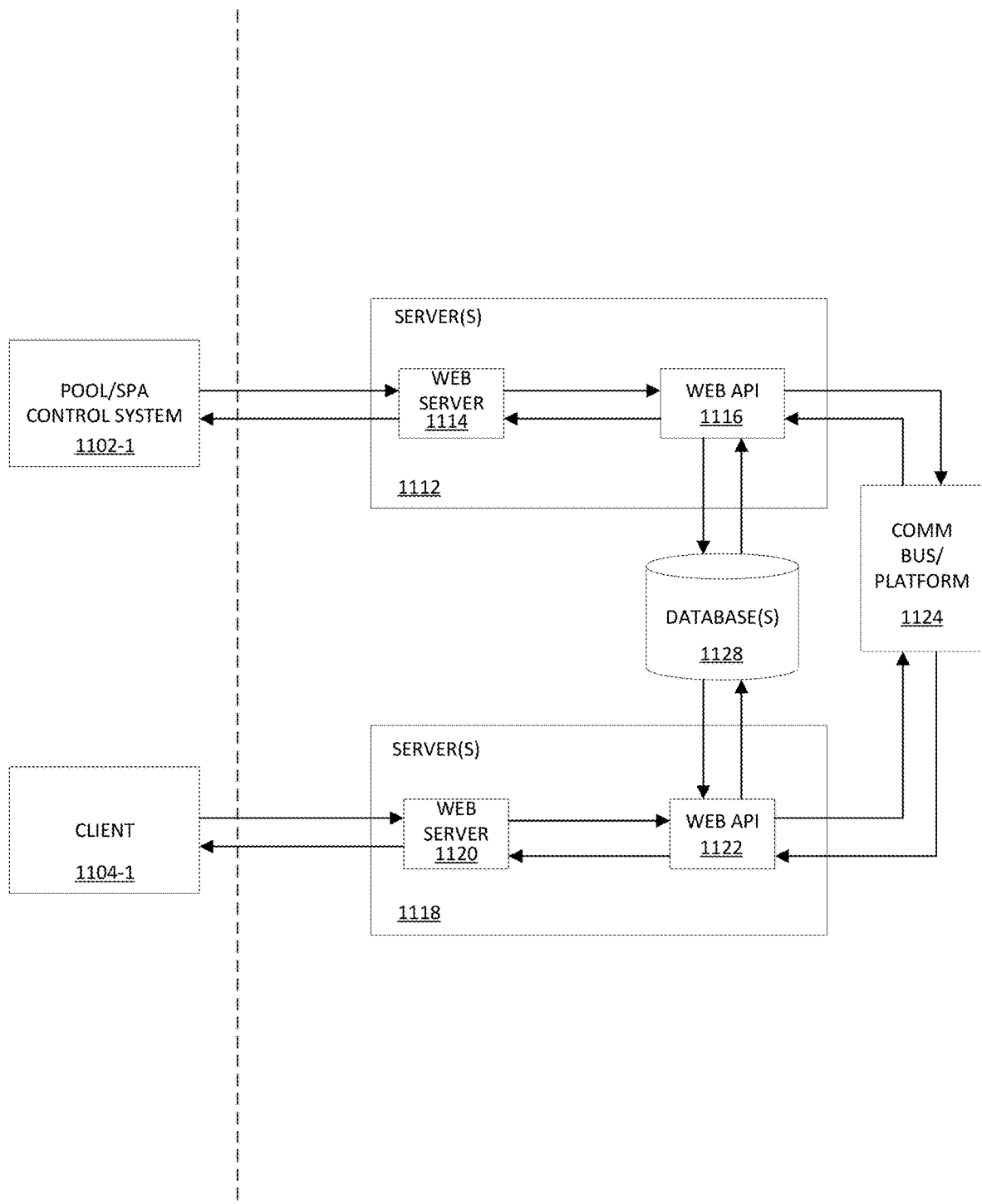
FIG. 11B is a block diagram of an example embodiment showing a portion of the system architecture of FIG. 11A, in which a pool/spa computer system is connected to a first server and a user device client is connected to a second server.

The web API 1116 of the first server 1112 may be communicatively coupled to the web API 1122 of the second server 1118 via the communication bus/platform 1124 (e.g., which may be an Enterprise Serial Bus (ESB) or other applicable communication bus/platform). The communication bus/platform 1124 may manage communication between the server or server cluster 1112 and the server or server cluster 1118. In the illustrative example of FIG. 11B, a client 1104-1 is connected to the server or server cluster 1118 (e.g., based on assignment by the load balancer 1110) and a pool/spa control system 1102-1 is connected to the server or server cluster 1112 (e.g., based on assignment by the load balancer 1110). It should be noted that FIG. 11B provides a simplified view of a portion of the backend architecture 1100, in which some components/devices are not shown. The client 1104-1 may issue commands (e.g., in response to interaction with one or more icons/buttons of the user interface displayed at the client 1104-1) to the pool/spa control system 1102-1. For example, the client 1104-1 may transmit command data to the web server 1120, which may route the command data to the web API 1122, which may route the command data to the web API 1116 via the communication bus/platform 1124, which may route the command data to the web server 1114, which may router the command data to the pool/spa control system 1102-1. Upon receiving and processing the command data, the pool/spa control system 1102-1 may perform one or more actions (e.g., opening/closing valves, changing pump speeds, turning a pump on or off, adjusting a temperature setpoint of a heater, activating/deactivating a heater, adjusting jet pressure, adjusting a chemical setpoint of a chemical controller, activating/deactivating an automatic cleaner, turning lights on/off, initiating light shows, changing light colors, and/or scheduling actions to be performed during a time period defined in the command data) in response to the command data. The communication bus/platform 1124 may connect the server or server cluster 1112 to the server or server cluster 1118, such that the command data may be passed from the web API server 1122 to the web API server 1116.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A system for controlling a connected pool or spa system, comprising:
   one or more internet of things (IoT)-enabled pool or spa devices;
   a control system load center coupled to a remote device via an electronic communication network and a wireless transceiver, the control system load center designed to selectively control the one or more IoT-enabled pool or spa devices, the control system load center comprising:
   a memory device designed to store definitions of a plurality of feature circuits and respective logic functions associated with the plurality of feature circuits, wherein the definitions of the plurality of feature circuits are assigned using the remote device and include respective groups of pool or spa device circuits associated with multiple IoT-enabled pool or spa devices and wherein the respective logic functions associated with the plurality of feature circuits cause corresponding groups of pool or spa device circuits to activate when a corresponding feature circuit is activated;
   a processor communicatively coupled to the memory device, the processor executes computer-readable instructions which, when executed, cause the processor to:
   receive, from the remote device via the electronic communication network, a definition of a feature circuit group, the feature circuit group including at least two feature circuits of the plurality of feature circuits;
   receive command data from the remote device via the electronic communication network; and
   activate the feature circuit group in response to the command data, wherein activation of the feature circuit group causes a selective control of all of the respective groups of pool or spa device circuits associated with the at least two feature circuits according to the respective logic functions associated with the at least two feature circuits in response to the command data.

2. The system for controlling a connected pool or spa system of claim 1, wherein at least one logic function causes a corresponding group of pool or spa device circuits assigned to a corresponding feature circuit to be turned off when the corresponding feature circuit is activated.

3. The system for controlling a connected pool or spa system of claim 1, wherein at least one logic function causes a corresponding group of pool or spa device circuits assigned to a corresponding feature circuit to be turned on when the corresponding feature circuit is activated.

4. The system for controlling a connected pool or spa system of claim 1, wherein at least one logic function causes a first subset of circuits of a corresponding group of pool or spa device circuits assigned to a corresponding feature circuit to be turned off when a second subset of circuits of the corresponding group of pool or spa device circuits assigned to the corresponding feature circuit are turned on, when the corresponding feature circuit is activated.

5. The system for controlling a connected pool or spa system of claim 1, wherein at least one logic function defines time-based rules for activating at least a first pool or spa device circuit of a corresponding group of pool or spa device circuits assigned to a corresponding feature circuit.

6. The system for controlling a connected pool or spa system of claim 5, wherein the time-based rules are defined in relation to deactivating at least a second pool or spa device circuit assigned to the corresponding feature circuit.

7. The system for controlling a connected pool or spa system of claim 1, wherein at least one logic function associated with a corresponding feature circuit defines how a corresponding group of pool or spa device circuits assigned to the corresponding feature circuit are controlled individually, in connection to other pool or spa device circuits assigned to the corresponding feature circuit, or a combination thereof.

8. The system for controlling a connected pool or spa system of claim 1, wherein the one or more IoT-enabled pool or spa devices are provided in the form of a chemical controller, a smart valve, a pump, a heater, a light, a sensor, and automatic pool cover, a jet, a pool cleaner, or a combination thereof.

9. The system for controlling a connected pool or spa system of claim 1, wherein the respective groups of pool or spa device circuits are assigned to the plurality of feature circuits via the remote device without using auxiliary circuits or relay outputs.

10. A method for controlling a connected pool or spa system, comprising:
   providing one or more internet of things (IoT)-enabled pool or spa devices;
   selectively controlling the one or more IoT-enabled pool or spa devices using a control system load center coupled to a remote device via an electronic communication network and a wireless transceiver;
   receiving definitions of a plurality of feature circuits and respective logic functions associated with the plurality of feature circuits via the remote device;
   storing the definitions of the plurality of feature circuits in a memory device of the control system load center, wherein the definitions include respective groups of pool or spa device circuits associated with multiple IoT-enabled pool or spa devices;
   receiving command data from the remote device via the electronic communication network, the command data indicative of an assignment of a subset of the plurality of feature circuits to a freeze protection mode;
   receiving a first ambient temperature from a temperature sensor of the one or more IoT-enabled pool or spa devices;
   detecting a freeze condition based on the first ambient temperature;
   identifying the subset of the plurality of feature circuits assigned to the freeze protection mode; and
   activating, using a processor coupled to the memory device, the subset of the plurality of feature circuits by selectively controlling the respective groups of pool or spa device circuits associated with the subset of the plurality of feature circuits according to the respective logic functions associated with the subset of the plurality of feature circuits.

11. The method for controlling a connected pool or spa system of claim 10, further comprising:
   activating a first pool or spa circuit of at least one group of pool or spa device circuits assigned to a corresponding feature circuit based on time-based rules associated with a corresponding logic function.

12. The method for controlling a connected pool or spa system of claim 11, wherein the time-based rules are defined in relation to deactivating at least a second pool or spa device circuit assigned to the corresponding feature circuit.

13. The method for controlling a connected pool or spa system of claim 10, further comprising:
   assigning the respective groups of pool or spa device circuits to the plurality of feature circuits via the remote device without using auxiliary circuits or relay outputs.

14. The method for controlling a connected pool or spa system of claim 10, further comprising:
   identifying the one or more IoT-enabled pool or spa devices assigned to the plurality of feature circuits using the processor of the control system load center.

15. The method for controlling a connected pool or spa system of claim 14, wherein identifying the one or more IoT-enabled pool or spa devices assigned to the plurality of feature circuits is based on corresponding definitions of the plurality of feature circuits.

16. The method for controlling a connected pool or spa system of claim 10, wherein at least one feature circuit is associated with a nocturnal cooling feature, wherein the method further comprises:
   activating the nocturnal cooling feature at a predefined time according to a user-created schedule; and
   circulating warm pool water through a solar collector panel at the predefined time.

17. A system for controlling a connected pool or spa system, comprising:
   one or more internet of things (IoT)-enabled pool or spa devices;
   a control system load center coupled to a remote device designed to selectively control the one or more IoT-enabled pool or spa devices, the control system load center comprising:
      a memory device designed to store definitions of a plurality of feature circuits and respective logic functions associated with the plurality of feature circuits, wherein the definitions of the plurality of feature circuits are assigned using the remote device and include respective groups of pool or spa device circuits associated with multiple IoT-enabled pool or spa devices, wherein the respective logic functions associated with the plurality of feature circuits cause corresponding groups of pool or spa device circuits to activate when a corresponding feature circuit is activated;
      a processor communicatively coupled to the memory device, the processor executes computer-readable instructions which, when executed, cause the processor to:
         receive, from the remote device via an electronic communication network, a definition of a feature circuit group, the feature circuit group including at least two feature circuits of the plurality of feature circuits;
         generate a display for the remote device indicating at least two feature circuits included in the feature circuit group and including a button element for activating the feature circuit group;

receive command data from the remote device via the electronic communication network, the command data indicative of interaction with the button element;

in response to the command data, activate the feature circuit group, wherein activation of the feature circuit group causes a selective control of all of the respective groups of pool or spa device circuits associated with the at least two feature circuits according to the respective logic functions associated with the at least two feature circuits.

18. The system for controlling a connected pool or spa system of claim 17, wherein the one or more IoT-enabled pool or spa devices is provided in the form of a chemical controller, a smart valve, a pump, a heater, a light, a sensor, and automatic pool cover, a jet, a pool cleaner, or a combination thereof.

19. The system for controlling a connected pool or spa system of claim 17, wherein the respective groups of pool or spa device circuits are assigned to the plurality of feature circuits via the remote device without using auxiliary circuits or relay outputs.

* * * * *